United States Patent [19]
Kajitani et al.

[11] Patent Number: 5,511,446
[45] Date of Patent: Apr. 30, 1996

[54] FLYWHEEL ASSEMBLY

[75] Inventors: Koji Kajitani; Hirotaka Fukushima; Manoru Okubo; Naoki Yanagida; Mitsuhiko Takenaka; Mitsuo Touji; Kozo Yamamoto, all of Neyagawa, Japan

[73] Assignee: Kabushiki Kaisha Daikin Seisakusho, Neyagawa, Japan

[21] Appl. No.: 246,955

[22] Filed: May 20, 1994

Related U.S. Application Data

[63] Continuation of Ser. No. 938,863, Sep. 1, 1992, Pat. No. 5,355,747.

[30] Foreign Application Priority Data

| | | | |
|---|---|---|---|
| Sep. 4, 1991 | [JP] | Japan | 4-70801 |
| Sep. 4, 1991 | [JP] | Japan | 3-70802 |
| Sep. 4, 1991 | [JP] | Japan | 3-70803 |
| Sep. 4, 1991 | [JP] | Japan | 3-70804 |
| Sep. 4, 1991 | [JP] | Japan | 3-70805 |
| Sep. 18, 1991 | [JP] | Japan | 3-237926 |
| Nov. 8, 1991 | [JP] | Japan | 3-292954 |

[51] Int. Cl.⁶ ............................. F16F 15/22; G05G 1/00
[52] U.S. Cl. ................ 74/573 F; 74/572; 74/574; 192/70.16; 192/30 V; 464/162
[58] Field of Search .................. 74/572–574; 192/70.16, 192/30 R, 70.17, 106 F, 113.26, 30 V, 3.29; 464/98, 162

[56] References Cited

U.S. PATENT DOCUMENTS

| | | | |
|---|---|---|---|
| 2,346,732 | 4/1944 | Crawford et al. | 74/574 |
| 4,462,269 | 7/1984 | Inglis | 74/572 |
| 4,739,866 | 4/1988 | Reik et al. | 74/574 X |
| 4,783,895 | 11/1988 | Reik | 74/574 |
| 4,788,884 | 12/1988 | Reik et al. | 74/574 |
| 4,846,759 | 7/1989 | Worner et al. | 464/68 |
| 4,874,350 | 10/1989 | Casse et al. | 192/106.1 |
| 5,062,517 | 11/1991 | Muchmore et al. | 74/574 X |
| 5,111,714 | 5/1992 | Honoki et al. | 74/574 |
| 5,156,249 | 10/1992 | Friedmann | 192/70.17 X |
| 5,180,044 | 1/1993 | Fukushima et al. | 74/574 X |
| 5,195,621 | 3/1993 | Dull et al. | 192/3.29 |
| 5,253,740 | 10/1993 | Kohno et al. | 192/30 V X |
| 5,323,665 | 6/1994 | Rediker | 74/574 |
| 5,368,146 | 11/1994 | Kohno et al. | 192/70.16 |

FOREIGN PATENT DOCUMENTS

| | | | |
|---|---|---|---|
| 679840 | 2/1964 | Canada | 74/574 |
| 62-194051 | 8/1987 | Japan | 74/574 |
| 2-118228 | 5/1990 | Japan | 74/574 |
| 4-165144 | 6/1992 | Japan | 74/574 |
| 4-194433 | 7/1992 | Japan | 74/574 |
| 2186344 | 8/1987 | United Kingdom | 74/574 |
| 2241560 | 9/1991 | United Kingdom | 74/574 |
| WO91/10078 | 7/1991 | WIPO | 74/574 |

Primary Examiner—Vinh T. Luong
Attorney, Agent, or Firm—Knobbe, Martens, Olson & Bear

[57] ABSTRACT

A flywheel assembly comprises a first flywheel connectable to an engine, a second flywheel, and an inter-flywheel viscous damping mechanism, providing viscous damping through a fluid of flywheel torsional vibrations. The second flywheel is rotatably supported on the first flywheel and has a friction facing on which a friction material presses. The second flywheel includes an annular capturing channel provided radially inward of the friction facing for capturing fluid from leakage driven on the friction facing side by centrifugal force, and a plurality of through-holes, extending from the capturing channel to a space between the flywheels, for guiding fluid captured by the capturing channel to the space.

7 Claims, 20 Drawing Sheets

FLYWHEEL ASSEMBLY

This is a continuation application of the U.S. patent application Ser. No. 07/938,863 filed Sep. 1, 1992 entitled "FLYWHEEL ASSEMBLY" now U.S. Pat. No. 5,355,747 issued on Oct. 18, 1994.

BACKGROUND OF THE INVENTION

The present Invention relates to a flywheel assembly, and particularly to a flywheel assembly comprising a first flywheel, a second flywheel, and a viscous damping mechanism located between the flywheels.

Compound flywheel assemblies for automobile engines are in current use. Such a flywheel assembly typically comprises first and second flywheels, with a viscous damping mechanism disposed between them. The first and second flywheels are rotatably connected to each other through a bearing. The second flywheel has a friction facing onto which friction material of a clutch disc presses.

Lubricant is sealed within the bearing disposed between the flywheels. However, prolonged operation deteriorates time sealing ability therein, such that lubricant can leak out and reach the friction facing of the second flywheel, causing clutch slippage.

The viscous damping mechanism employed in between the flywheels is filled with a fluid such as grease. The fluid may leak through the bearing and/or seals and splash out over the friction facing. Lubricant thus will stick to the clutch, further contributing to slippage problems.

Power from the first flywheel Is transmitted through an output plate to the second flywheel. The output plate and the second flywheel are engaged by corresponding geartooth portions. Some grease should flow from the viscous damping mechanism and enter the engagements of the output plate and the second flywheel in order to provide lubrication therein. High operating temperatures, however, thin the lubricant, and furthermore highspeed rotation drives it radially outward, such that the lubricant tends to run short at the engagements, leading to fretting of the gearteeth.

The viscous damping mechanism absorbs torsional vibrations during the transmission of power from the engine, but it cannot, however, absorb bending oscillations which arise at the same time. Such bending oscillations are transmitted to the transmission, resulting In vehicle noise.

SUMMARY OF THE INVENTION

It is an object of the present Invention to reduce splashing of lubricant onto the clutch so as to restrain clutch slippage.

It Is another other object of the Invention to ensure sufficient supply of lubricant to the engagements of the output plate and the second flywheel.

It is a further object of the present Invention to reduce transmission noise during vehicle-operation.

(1) A flywheel assembly according to an aspect of the present invention comprises a first flywheel, a second flywheel, and a viscous damping mechanism. The first flywheel is connectable to an engine. The second flywheel is rotatably supported by the first flywheel and has a friction facing onto which a clutch friction material presses. The viscous damping mechanism is disposed between the first and second flywheels and damps torsional vibrations therebetween through the viscosity of fluid it contains. Formed on the second flywheel radially inward of the friction facing is an annular channel for capturing fluid driven toward the friction facing by centrifugal force, and a series of through-holes extending from the annular channel into a space between the flywheels.

During operation, tile annular channel captures fluid traveling along the second flywheel toward the friction facing. The through-holes then drain the fluid toward the first flywheel. This reduces fluid leakage to the friction facing of the second flywheel, restraining clutch slippage.

(2) A flywheel assembly according to another aspect of the invention comprises a first flywheel, an output plate, a second flywheel, a viscous damping mechanism, and first and second guides. The first flywheel defines a cavity and is connectable to an input rotation member. The output plate is contained in the cavity and has an engagement along its radially inward edge. The second flywheel includes a central hub having a peripheral engagement which meshes with the engagement of the output plate. The second flywheel is rotatably supported on the first flywheel. The viscous damping mechanism is located on the output plate for damping torsional vibrations. The first guide is at the engagements of the hub and output plate, and guides fluid from the viscous damping mechanism to the region of the engagements. The second guide, radially inward of the engagements, guides fluid radially outward back to their meshing region. As a result, enough fluid is supplied to maintain sufficient lubrication of the engagements.

(3) A flywheel assembly according to a further aspect comprises a first flywheel, a second flywheel, a viscous damping mechanism, and a flexible plate. The first flywheel has a central hub which Is rotatably engageable with the recessed end of an engine crankshaft. The second flywheel is rotatably supported by the first flywheel and Is connectable to a member linking it with a transmission. The viscous damping mechanism is disposed between the first and second flywheels for damping torsional vibrations therebetween. The flexible plate has arms fixed to the periphery of the first flywheel and a central boss fixed to the end of the crankshaft, wherein It absorbs bending oscillations from the engine.

Bending oscillations, generated in power transmission during driving of the vehicle in which the assembly is operative, are thus absorbed by the flexible plate. That is, transmission of bending oscillations from the engine side to the transmission side of the assembly Is curtailed, thereby reducing vehicle noise.

The foregoing and other objects and advantages of the present invention will become more apparent from the following detailed description, with reference to the accompanying drawings.

DESCRIPTION OF THE PREFERRED EMBODIMENTS

First Embodiment

Figure 1:
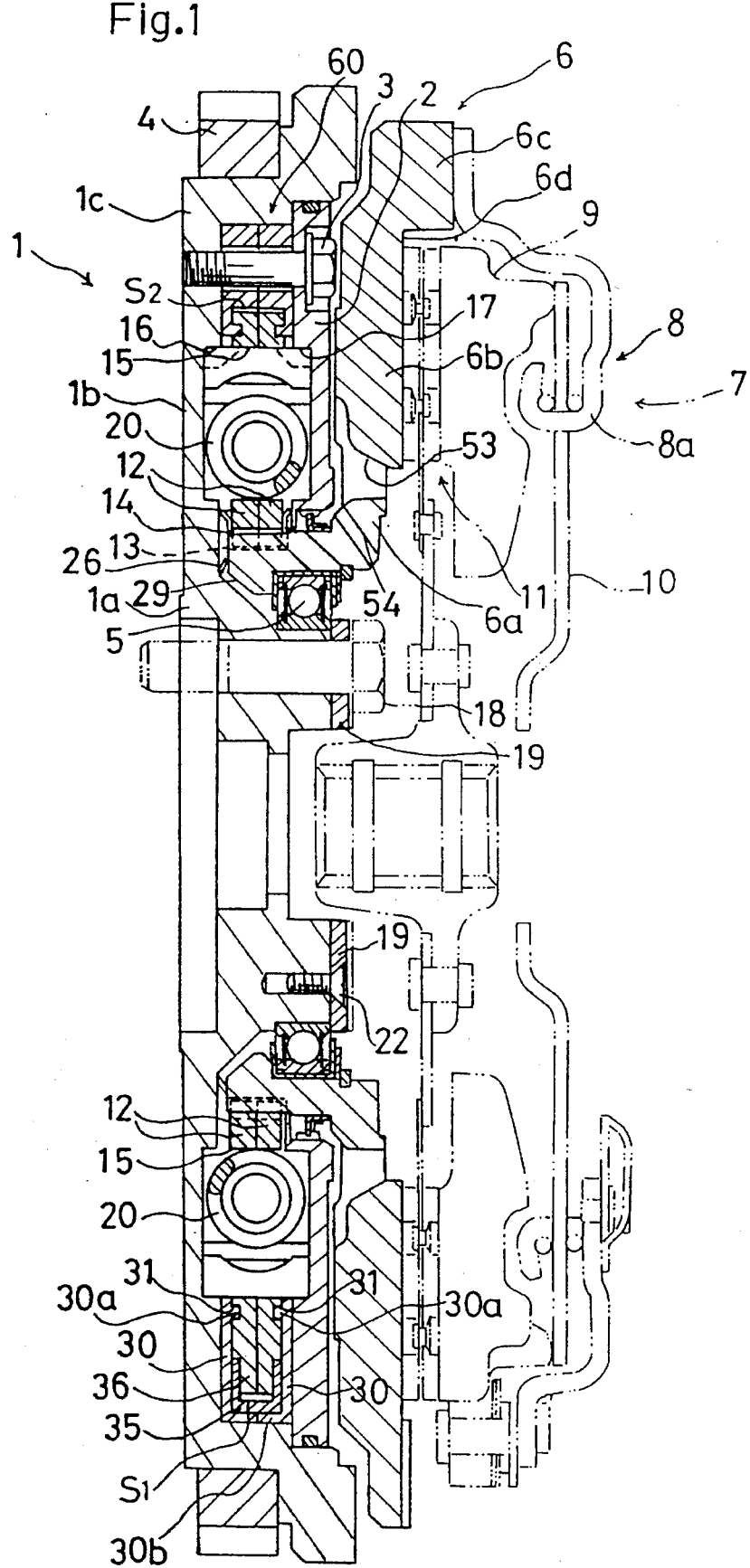
FIG. 1 is a split-open sectional view of a flywheel assembly according to a first embodiment, taken along the line I—I indicated in FIG. 2.

FIG. 1 shows a flywheel assembly as an embodiment according to the present invention.

This flywheel assembly comprises a first flywheel 1, a second flywheel 6 rotatably supported by the first flywheel 1 through a bearing 5, and a viscous damper mechanism 60 disposed between the first flywheel 1 and the second flywheel 6. The first flywheel 1 is fixed to the crankshaft (next shown) of a motor vehicle engine. A clutch 7 is mountable on the second flywheel 6.

The first flywheel 1 is a composite disc formed by a central hub 1a connected to the crankshaft by bolts 18, a collar portion 1b integral with the hub 1a and extending radially, and a flywheel portion 1c integrally formed around the periphery of the collar portion 1b.

The hub 1a extends into the second flywheel 6 and rotatably supports it through the bearing 5 disposed thereon. The bearing 5 is retained by a plate 19 attached to the crown of the hub 1a through screws 22. A stopper plate 2 are located opposite the collar portion 1b, such that a fixed space is defined therebetween. The stop plate 2 is fastened to the collar portion 1b through bolts 3. Located between the collar portion 1b and the stop plate 2 is the viscous damper mechanism 60, which is so constructed as to be removed easily from the collar portion 1b by removing the bolts 3.

The second flywheel 6 is a composite disc formed by a central hub 6a, a pressure portion 6b Integral with the hub 6a and extending in the radial direction, and a clutch mounting portion 6c integral with the periphery of the pressure portion 6b.

Figure 2:
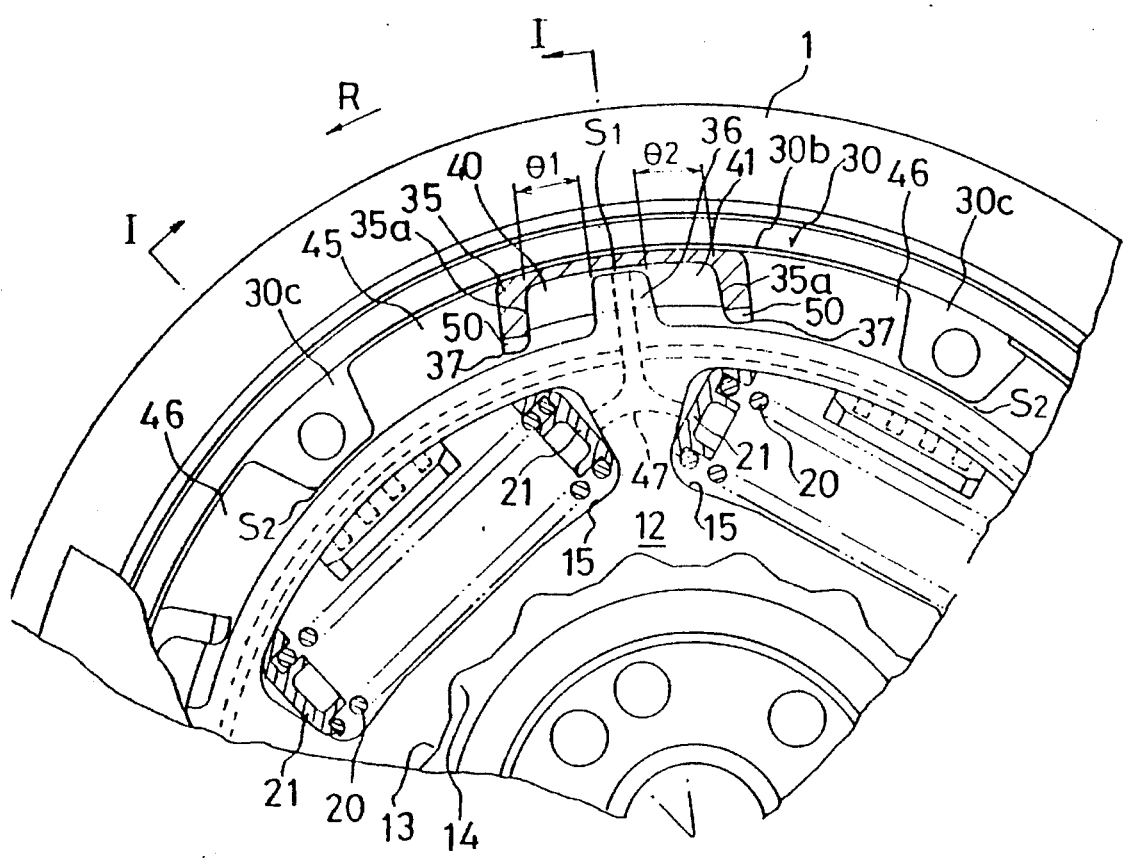
FIG. 2 is a partial side view of the flywheel assembly shown in FIG. 1.

The hub 6a extends toward the first flywheel 1 and its inner surface is supported by the bearing 5. Formed around the crown of the hub 6a are, as shown in FIG. 2, wave-like teeth 14 with which the viscous damper mechanism 60 is engaged. Surface of the pressure portion 6b on the clutch side is a friction facing 6d onto which the friction material of a clutch disc 11 presses. The friction facing 6d extends axially beyond the adjacent end face of the hub 6a, wherein the radially inner surface of this extension forms a receiving portion 52 circumferentially recessed. This receiving portion 52 captures grease escaping radially outward along the clutch disc 11-side surface of the second flywheel 6 under centrifugal force during operation.

Figure 4:
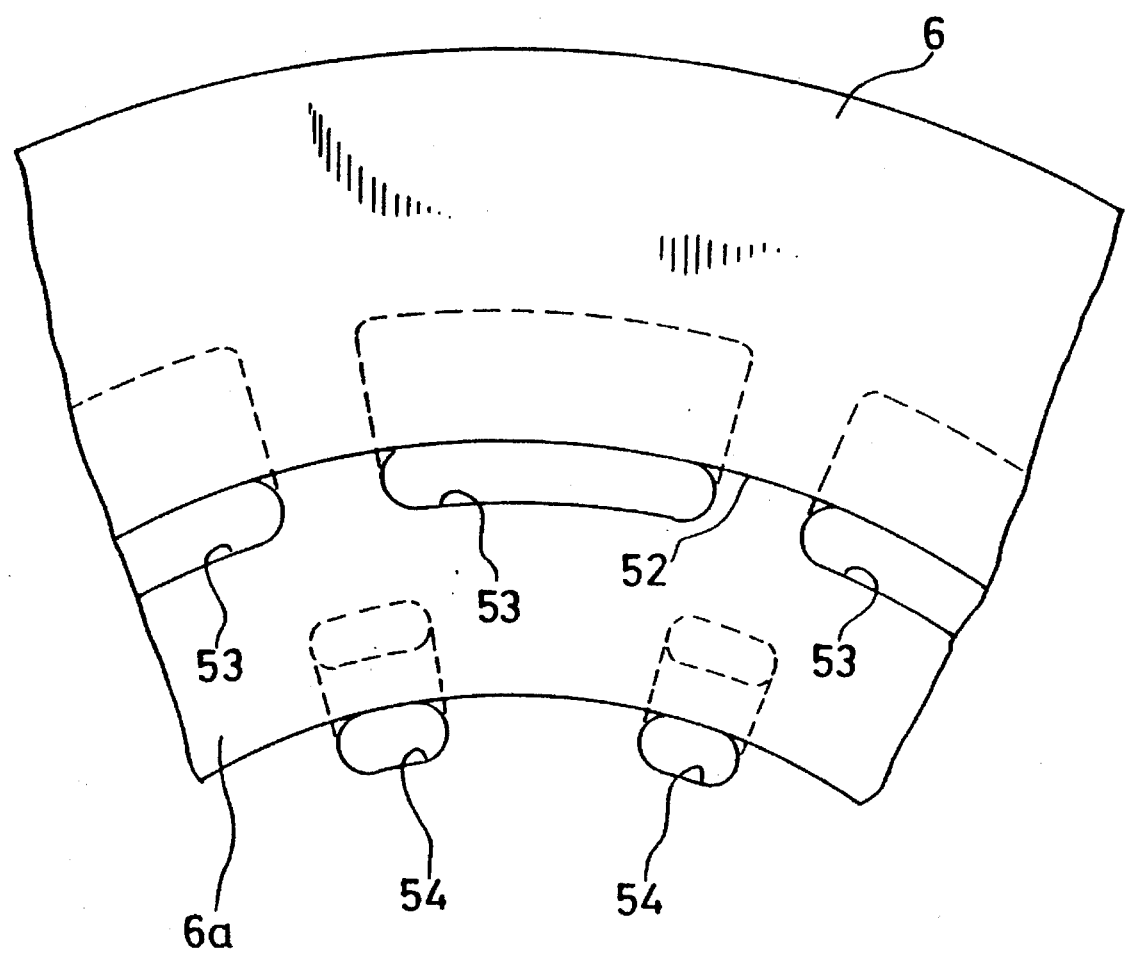
FIG. 4 is an enlarged partial view of a face of a second flywheel of the assembly.

Through-holes 53 are formed in the second flywheel 6 for draining the grease received by the receiving portion 52 toward the first flywheel 1. The through-holes 53 are, as shown in FIG. 4, rounded holes spaced from each other at intervals. The through-holes 53 widen in the direction toward the first flywheel such that grease can pass easily along the through-holes 53 toward the first flywheel 1.

A plurality of sub through-holes 54 are formed radially inward directly of those portions not bored by the through-holes 53, penetrating the second flywheel and slanting radially outward. The sub through-holes 54 complimentarily drain grease traveling along the clutch disc 11-side of the second flywheel 6 toward the first flywheel 1.

Figure 3:
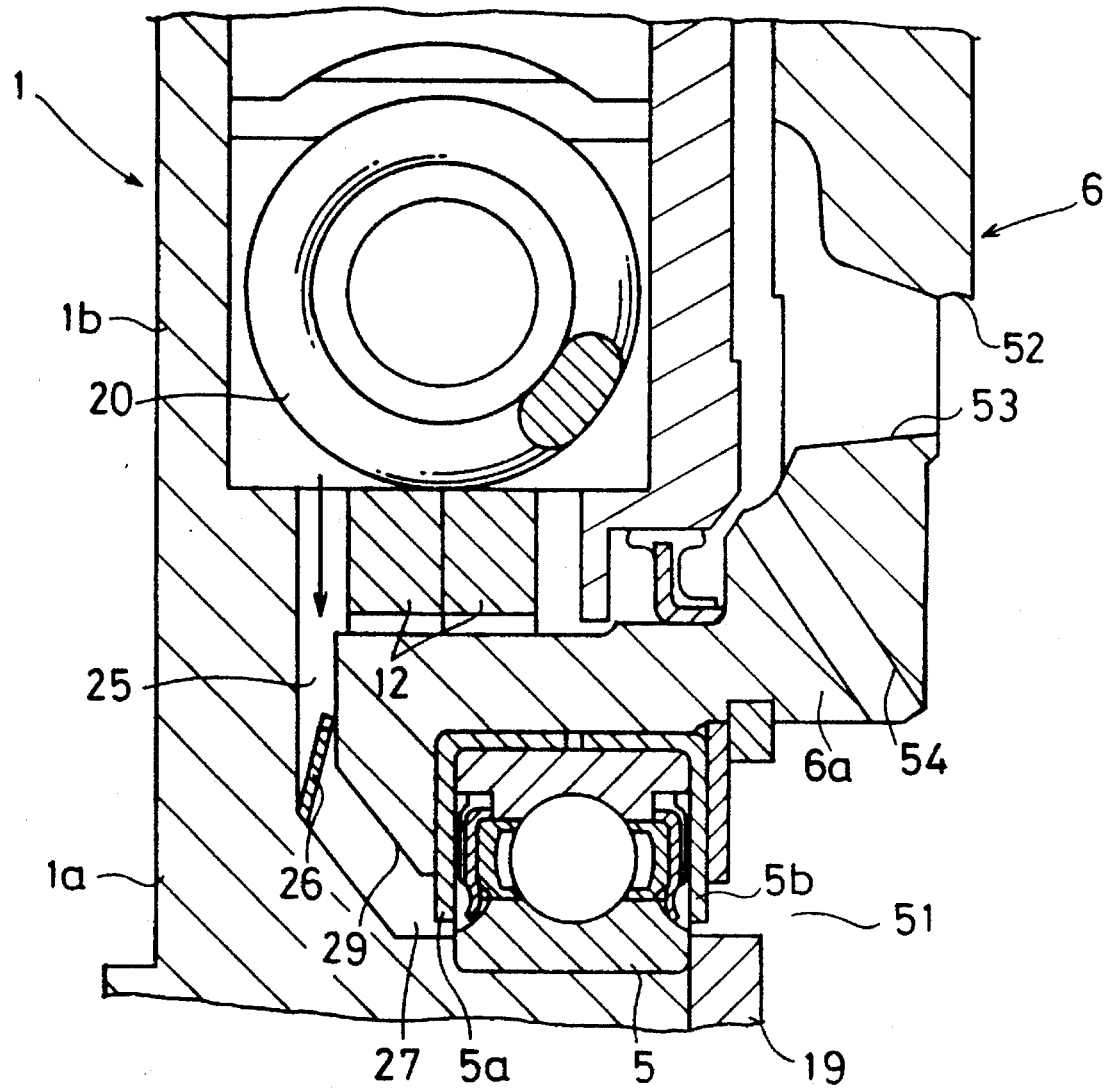
FIG. 3 is an enlarged partial view of FIG. 1.

A gap 25 is defined, as shown in FIG. 3, between the hub 6a crown and the hub 1a. A cone spring 26 is disposed in the gap 25.

Figure 5A:
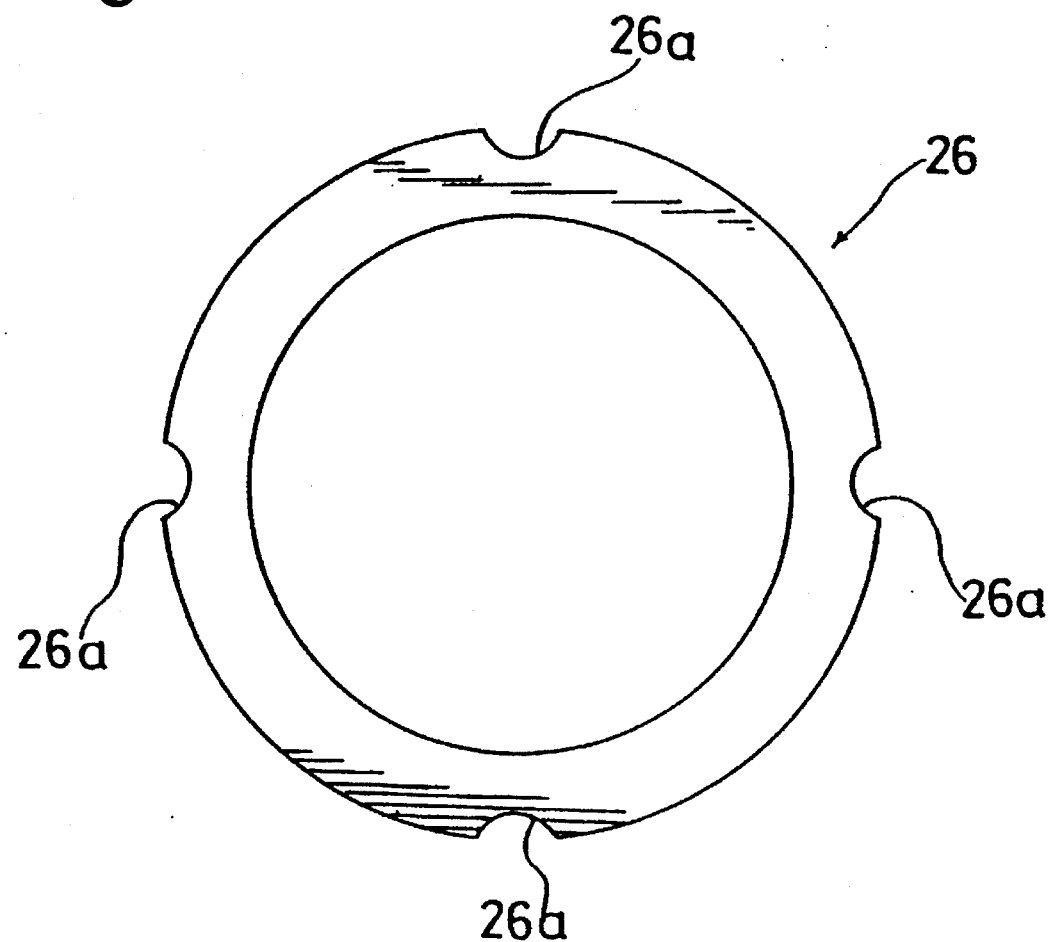
FIGS. 5a and 5b are respective plan and sectional views of a cone spring.
Figure 5B:
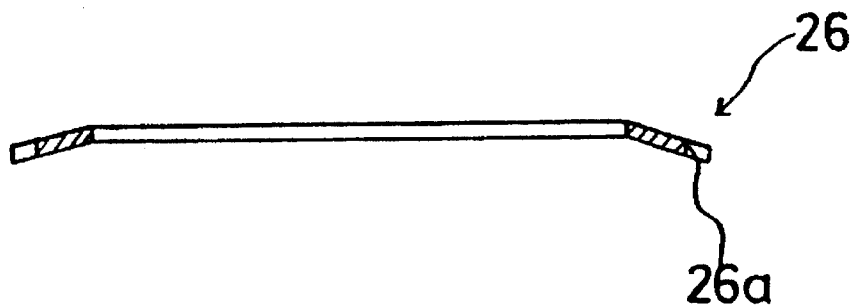

Inner and outer edges of the cone spring 26 press slightly against the hub 1a and 6a respectively. The cone spring 26 intercepts the gap 25 from a gap 27 radially inward of the gap 25 and between the hubs 1a and 6a. As shown in FIG. 5, the cone spring 26 has four cutouts 26a along its periphery. Wherein grease leaked from the viscous damper mechanism 60 enters the gap 27, it returns to the viscous damper mechanism 60 under centrifugal force through these cutouts 26a. The portion of the hub 6a radially inward of the crown is a beveled surface 29. The beveled surface 29 directs grease in the gap 27 toward the viscous damper mechanism 60.

The bearing 5 contains acrylic resin seals, and a pair of bearing seal members 5a and 5b caps the bearing peripherally and laterally. The bearing seal members 5a and 5b are made of polyphyenylene sulfide (PPS) resin. The rims of the inner race are notched in order to avoid contact with adjacent radially inward edges of the bearing seal members 5a and 5b.

A clutch cover assembly 8 containing the clutch 7 is mounted onto a corresponding facing of the clutch mounting portion 6c. The clutch cover assembly 8 is composed of a clutch cover 8a, a pressure plate 9 and a diaphragm spring 10. The clutch cover 8a houses the clutch disc 11.

Next, the viscous damper mechanism 60 will be explained.

The viscous damper mechanism 60 includes a pair of driven plates 12. The driven plates 12 have, as shown in FIG. 2, wave-like teeth 13 which engage with the wave-like teeth 14 formed around the crown of the hub 6a of the second flywheel 6. This engagement makes it possible for the driven plate 12 and the second flywheel 6 to rotate integrally.

The driven plates 12 have, as shown in FIG. 2, a plurality of apertures 15 circumferentially spaced apart from one another. Formed in portions of the collar portion 1b and the stop plate 2 which correspond to the apertures 15 are recesses 16 and 17, respectively (see FIG. 1). Coil springs 20 for transmitting torsional torque are so arranged in the apertures 15 and recesses 16 and 17 as to be circumferentially compressible. The coil springs 20 abut against the circumferentially opposing walls of the apertures 15, as well as the recesses 16 and 17, through spring seats 21. When the viscous damper mechanism 60 is not activated, only the radially inward ends of the spring seats 21 abut against the circumferentially opposing walls of the apertures 15. That is, the coil springs 20 contained in the apertures 15 have their ends situated on a bias with respect to the opposing walls of the apertures 15.

Figure 6:
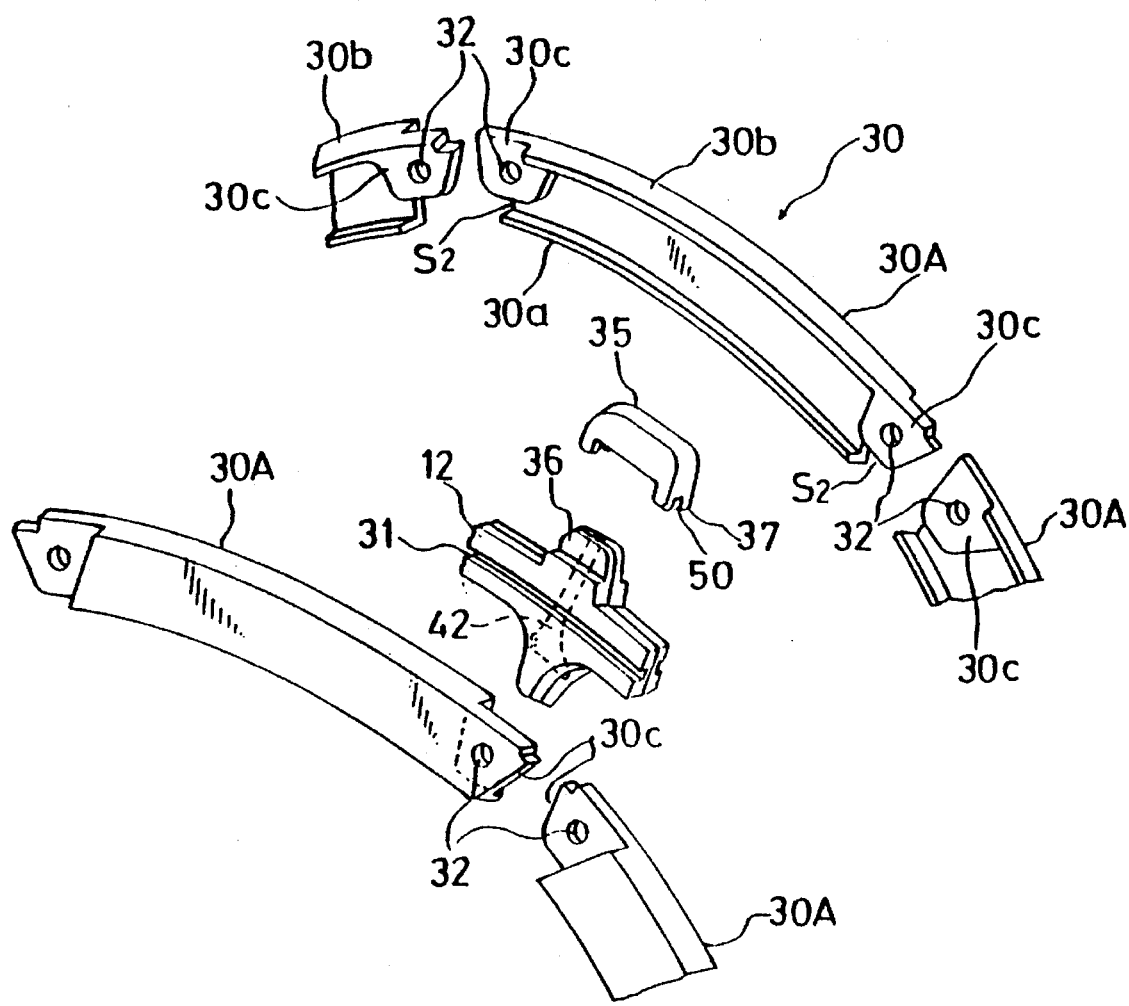
FIG. 6 is an exploded perspective view of a fluid housing.

An annular fluid housing 30, shown in FIG. 6, is sandwiched between the collar portion 1b and the stop plate 2 around the periphery of the driven plates 12, as shown in FIG. 1. The fluid housing 30 has a plurality of tabs 30c circumferentially spaced apart from one another, as shown in FIG. 2 and FIG. 6. The tabs 30c project radially inwards. In addition, the tabs 30c have holes 82 which the bolts 3 penetrate. The fluid housing 30 is composed of substantially sectoral housing members 30A. The complementary tabs 30c of adjacent housing members 30A are overlapped with each other, and thus the fluid housing 30 forms an annular configuration. Along the radially inward portion of the fluid housing 30 are an opposed pair of interior rims 30a, which fit into annular grooves 31 formed in the driven plates 12 in order to seal a fluid chamber defined by the fluid housing 30. Thus the walls of the fluid-housing 30 peripherally enclose the fluid chamber.

A slider 35 is slidably disposed in the circumferential direction within the fluid housing 30. The slider 35 is formed as a cap which opens radially inwardly, and its outer peripheral surface in the radial direction is arced to conform to the inner surface of peripheral wall 30b of the fluid housing 30. Leg portions 37 are formed at each of the four corners of the open end of the slider 35, thus providing fluid passages 50 between adjacent pairs of the leg portions 37. Referring to FIG. 2, the leg portions 37 of the slider 35 are in slidable contact with the peripheral composite edge of the driven plates 12.

Projections 36 are formed on the composite periphery of the driven plates 12 and project radially outward. Each projection 36 projects into a corresponding slider 35. The circumferentially opposing wails of each slider 35 form stops 35a which are circumferentially spaced apart from the projection 36 by, for example, angles of θ1 and θ2, respectively, when the engine is at rest. The projection 36 divides the space interior of the slider 35 into a first subcompartment 40 in its forward portion and a second subcompartment 41 in its rear portion with respect to the direction of rotation R, and forms a subchoke S1, whereby the subcompartments 40 and 41 communicate along the inner surface of the slider 35.

Main chokes S2, by which adjacent compartments 45 and 46 communicate, are formed between the concave inner surface of the tabs 30c and the peripheral composite edge of the driven plates 12. The clearance of the main chokes S2 is smaller than that of the subchokes S1. In other words, the cross-sectional area of a subchoke S1 is greater than that of a main choke S2. Fluid compensation paths 47 are formed between the walls of the driven plates 12. Each fluid path 47 opens out toward the corresponding slider 35 in the radially outer edge of the projection 36. The fluid path 47 extends radially inward from this opening and branches in two toward the apertures 15, opening into them.

Description will now be made of the operation of the flywheel assembly.

When torsional torque is generated during operation, the first flywheel 1 is rotated clockwise or counterclockwise relative to the direction of rotation of the driven plates 12. Initially, under small-angle torsion, the toll springs 20 are compressed such that their biased ends Just meet the adjacent walls of the apertures 15, wherein the viscous damper mechanism 60 provides low-torsion rigidity. As the angle of torsion increases, the coil springs 20 are compressed such that their effected ends abut the corresponding end faces of the apertures 15, wherein the viscous damper mechanism 60 provides high-torsion rigidity.

The following is a description of the generation of hysteresis torque due to the flow of fluid caused by changes in torsional torque.

Figure 7:
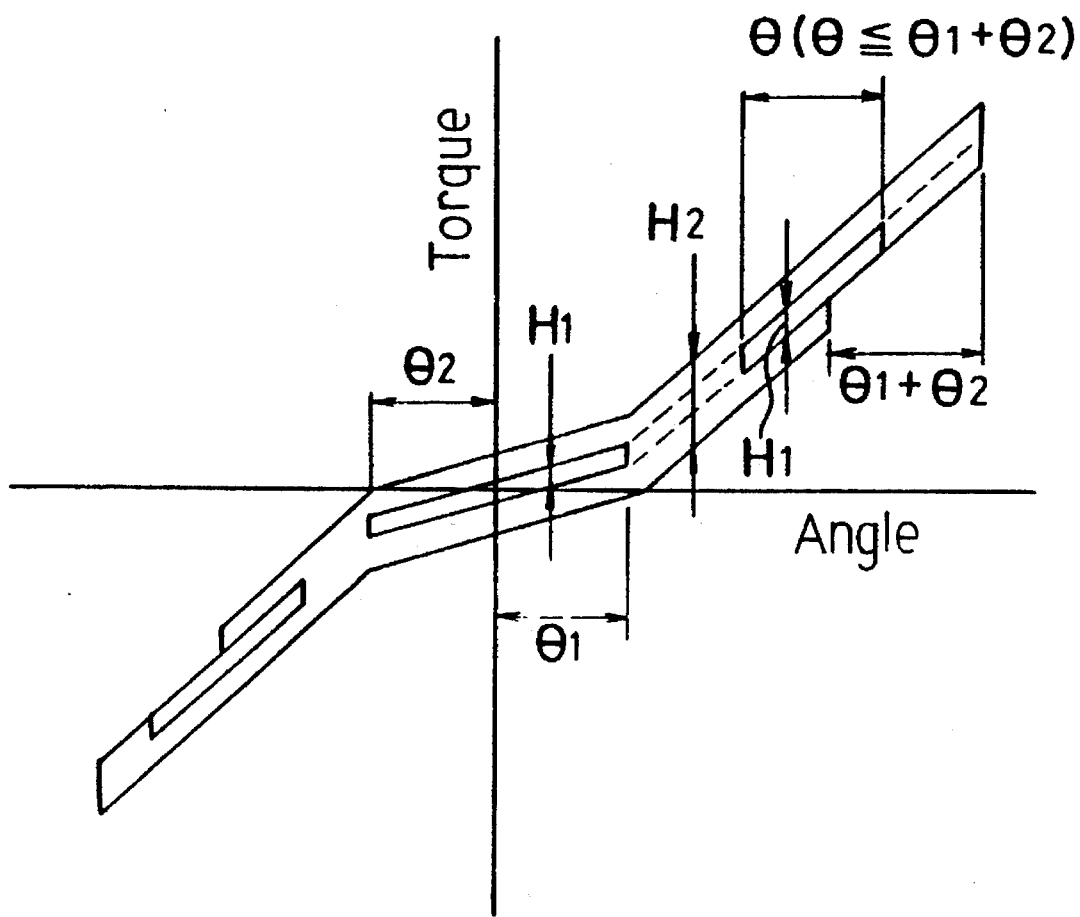
FIG. 7 is a graph Illustrating damping characteristics.

Given the state wherein the projection 36 is not abutting against either of the stop portions 35a of the slider 35, and that the flywheel 1 rotates in, for example, the direction R relative to the driven plates 12, then, the housing 30 and the slider 35 move in union in the direction R. Consequently, the second subcompartment 41 is compressed, whereby its volume decreases, and at the same time, the first subcompartment 40 is enlarged, whereby its volume increases. As a result, the fluid flows mainly from the second subcompartment 41 into the first subcompartment 40 through the subchoke S1. In this instance, since the cross-sectional area of subchoke S1 is large, the resistance of the passage is small. Consequently, the hysteresis torque H1 (see FIG. 7) generated is low.

When the angle of torsion becomes so great that the stop portion 35a of the trailing-end wall of the slider 35 with respect to the direction R contacts the projection 36, the subchoke S1 is closed and the slider 35 is pressed against the projection 36. That is, the slider 35 moves in conjunction with the projection 36. The first flywheel 1 and the housing 30 move forward in the direction R relative to the driven plates 12 and the slider 35. Consequently, fluid in the following compartment 46 flows reverse to the direction R into the leading compartment 45 through the main choke S2, and also flows forward in the direction R into the first compartment 45 through the gap between the outer surface of the slider 35 and the housing 30. In this instance, since the cross-sectional area of the main choke S2 is small, high fluid resistance thereby obtains. Consequently, the hysteresis torque H2 (FIG. 7) generated is high.

As the first flywheel 1 reverts after a forward rotation as described above, the stop portion 35a of trailing-end wall of the slider 30 first separates from the projection 36, so that the subchoke S1 is operative. Fluid then flows mainly from the first subcompartment 40 into the second subcompartment 41 through the subchoke S1, wherein the torsional angle falls in the range of θ1+θ2. Consequently, the hysteresis torque Hi generated is low.

When small torque fluctuations occur due to, for example, combustion vibration wherein the first flywheel 1 is twisted at an angle relative to the driven plate 12, the slider 35 will reciprocate within the range of the torsional angles θ1+θ2. Consequently, the subchoke S1 functions such that the hysteresis torque H1 is generated is low.

Accordingly, as described in the foregoing, the hysteresis torque response is not determined by the absolute torsional angle of the first flywheel 1 relative to the driven plates 12, but by the positional relation between the slider 35 and the projection 36.

During the aforedescribed operation, the fluid in the housing 30 is driven radially outward of the damper mechanism 60 by centrifugal force. However, when the viscous damper mechanism 60 operates, it may happen that the fluid travels radially inward, resisting the centrifugal force, and then moves into the gap 25 radially inward of the coil springs 20 through the portion sealed by the interior rims 30a. Since the gap 25 is intercepted from the gap 27 by the cone spring 26, almost all of this fluid in the gap 25 is stopped by the cone spring 26 and stands within the side of the cone spring 26 (on the hub 1a end surface). Then, the fluid will return to the housing 30 under centrifugal force.

Meanwhile, a small amount of the fluid in the gap 25 will enter the gap 27 through the cone spring 26, standing radially inward of the hub 6a. The fluid then travels along the beveled surface 29 of the hub 6a under centrifugal force toward the gap 25, and returns into the gap 25 through the cutouts 26a of the cone spring 26, further to return to the fluid chamber of the fluid housing 30.

As thus described, fluid which leaks out or the viscous damper mechanism 60 is prevented from standing at the bearing 5. Consequently, as the sealing ability of the bearing 5 decreases, the leakage of fluid from the bearing 5 toward the clutch 8 is still restrained, whereby slippage of the clutch disc 7 due to sticking fluid is reduced.

After long use, it may happen that fluid in the gap 25 leaks through a space 51 adjacent the bearing 5. Such fluid will enter the through-holes 54 under centrifugal force, moving toward the first flywheel 1. Meantime, any fluid which does not enter the through-holes 54 travels radially outward along the clutch disc-side of the second flywheel 6 under centrifugal force. The fluid is captured by the receiving portion 52, and then is drained toward the first flywheel 1 through the through-holes 53.

Accordingly, the fluid which travels radially outward along the clutch disc 11-side of the second flywheel 6 is kept from reaching the clutch disc 11, whereby slippage of the clutch disc 11 is reduced. Further, since the staggered through-holes 53 and 54 amount to full circumferential extension, they effectively take in fluid traveling on the clutch 11-side of the second flywheel 6.

Second Embodiment

Figure 8:
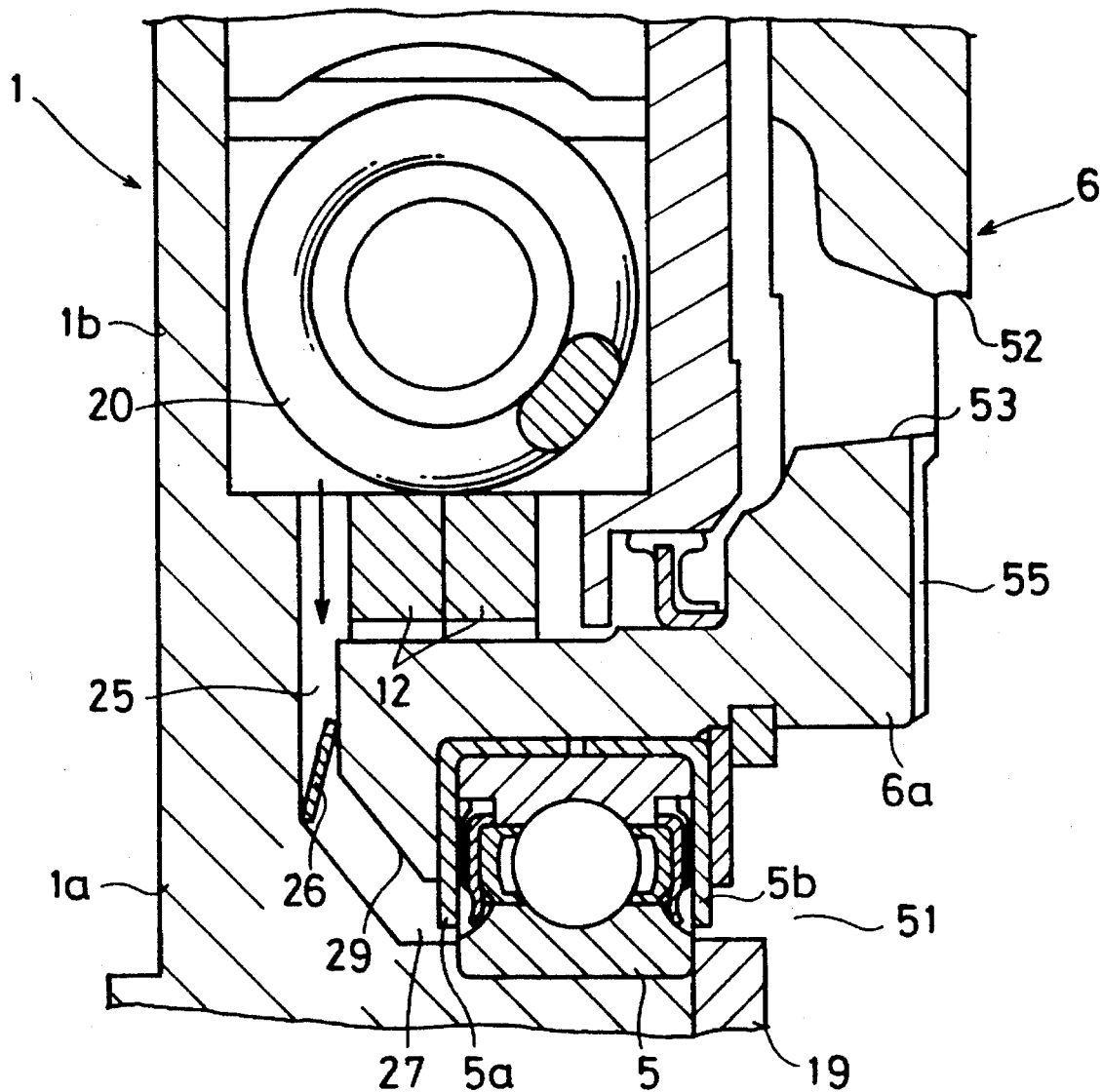
FIG. 8 is a view, corresponding to FIG. 3, of a second embodiment.
Figure 9:
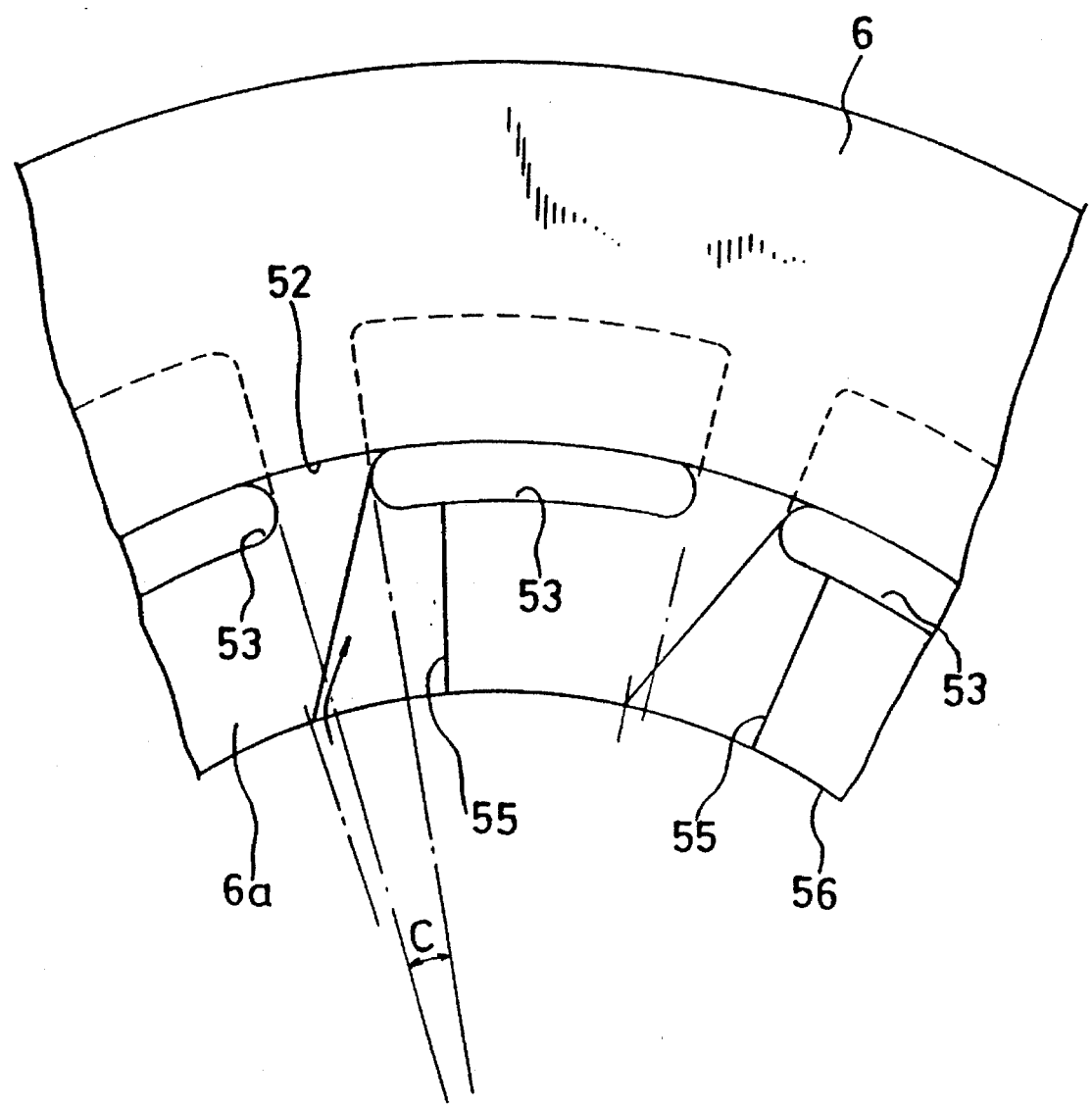
FIG. 9 is a view, corresponding to FIG. 4, of the second embodiment.

FIGS. 8 and 9 Illustrate a second embodiment.

In this embodiment, instead of the through-holes 54 formed in the second flywheel 6 of the first embodiment, the end face of the hub 6a is grooved by a plurality of guide grooves 55 extending radially outward. Each guide groove 55 is formed corresponding to a portion C not perforated by the through-holes 53. The guide grooves 55 are channeled from the radially inward edge 56 of the hub 6a to the through-holes 53. The remaining structures of the flywheel assembly are the same as those of the first embodiment.

In this second embodiment, some of the fluid which leaks into the space 51 from the bearing 5 travels radially outward along the guide grooves 55 under centrifugal force, thereupon passing through the through-holes 53 toward the first flywheel 1. The rest of any fluid in the space 51 travels radially outward along those regions of the end face not channeled by the guide grooves 55, and then is captured by the receiving portion 52 in order to be drained toward the first flywheel 1 through the through-holes 53.

Third Embodiment

In the aforementioned embodiments, the driven plates 12 and the second flywheel 6 are connected by the engagement of their respective gear teeth 13 and 14. The present invention, however, can be applied to different structures.

Figure 10:
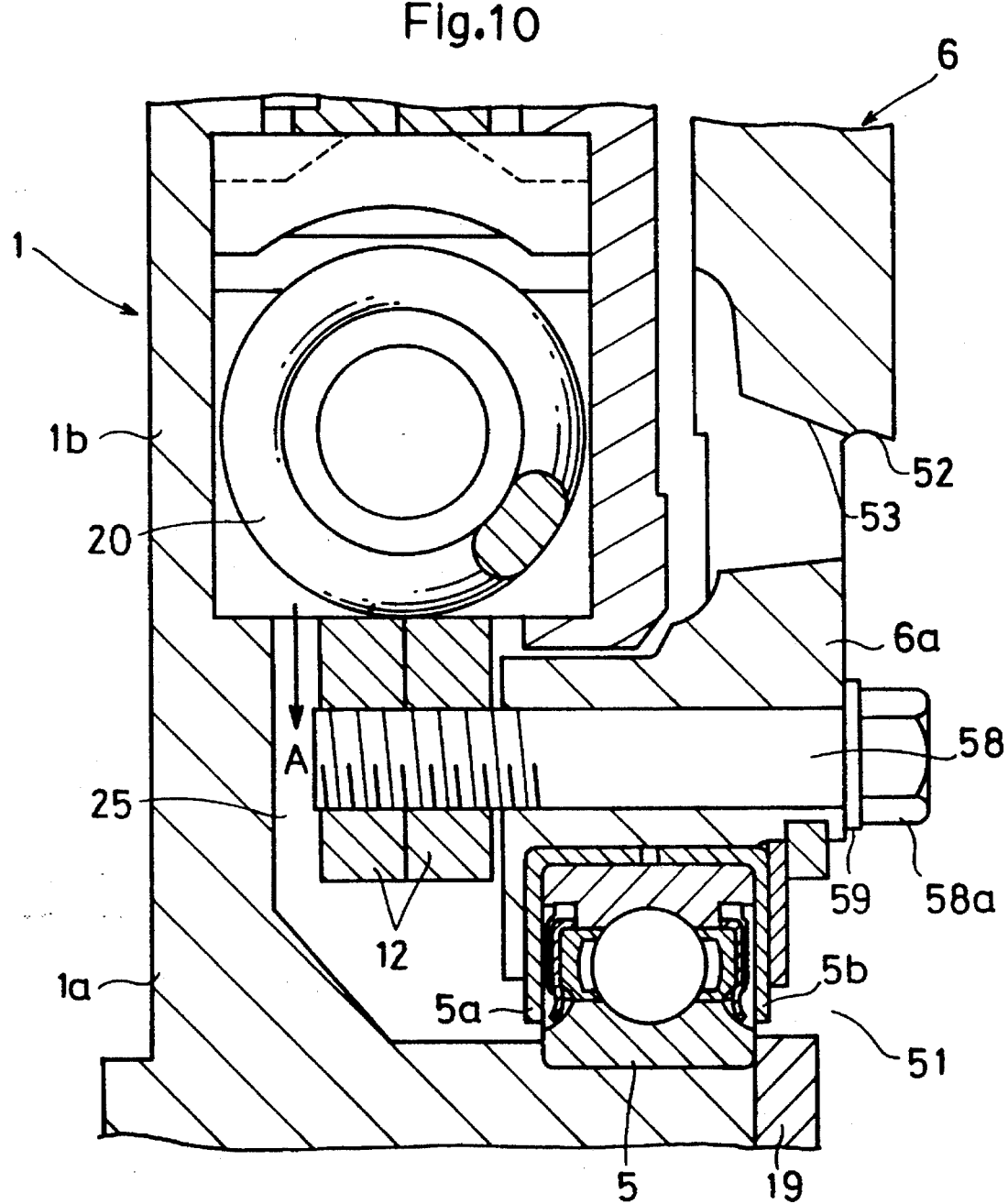
FIG. 10 is a view, corresponding to FIG. 3, of a third embodiment.

For example, as shown in FIG. 10, bolts 58 can be used which penetrate the hub 6a of the second flywheel 6 and driven plates 12 connecting them. A plane washer 59 is disposed between a head 58a of the bolt 58 and an end surface of the hub 6a. Each bolt 58 is, as shown in FIG. 11, fastened into a region C, corresponding to that portion not slotted by the through-holes 53.

Figure 11:
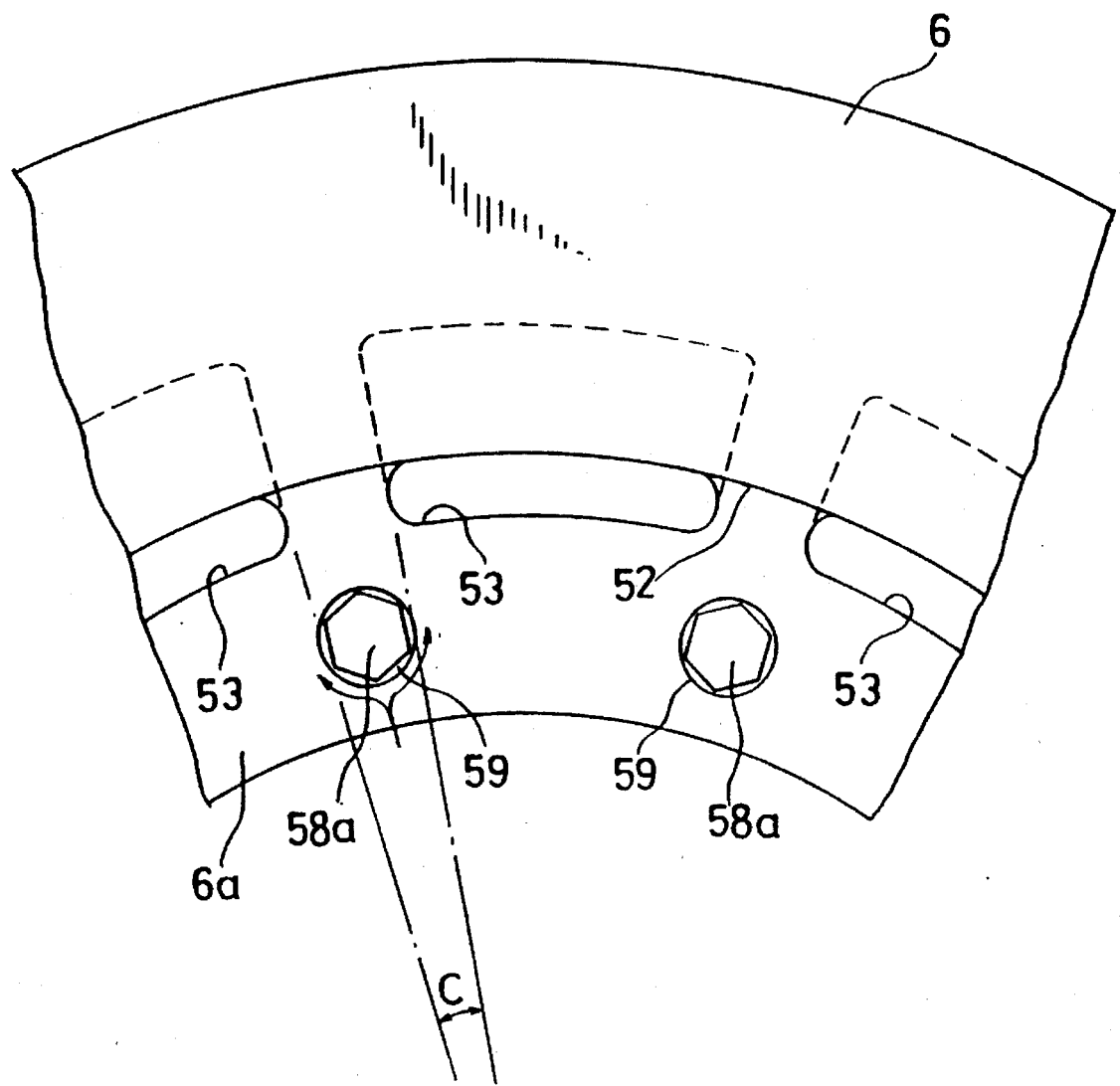
FIG. 11 is a view of the third embodiment, corresponding to FIG. 4.

In this case, fluid traveling along the region C is deflected by the head 58a of the bolt 58, as indicated by arrows in FIG. 11. The deflected fluid then enters the through-holes 53. Accordingly, fluid traveling radially outward along the hub 6a end face of the second flywheel 6 is effectively drained toward the first flywheel 1 through the through-holes 53.

Fourth Embodiment

Figure 12:
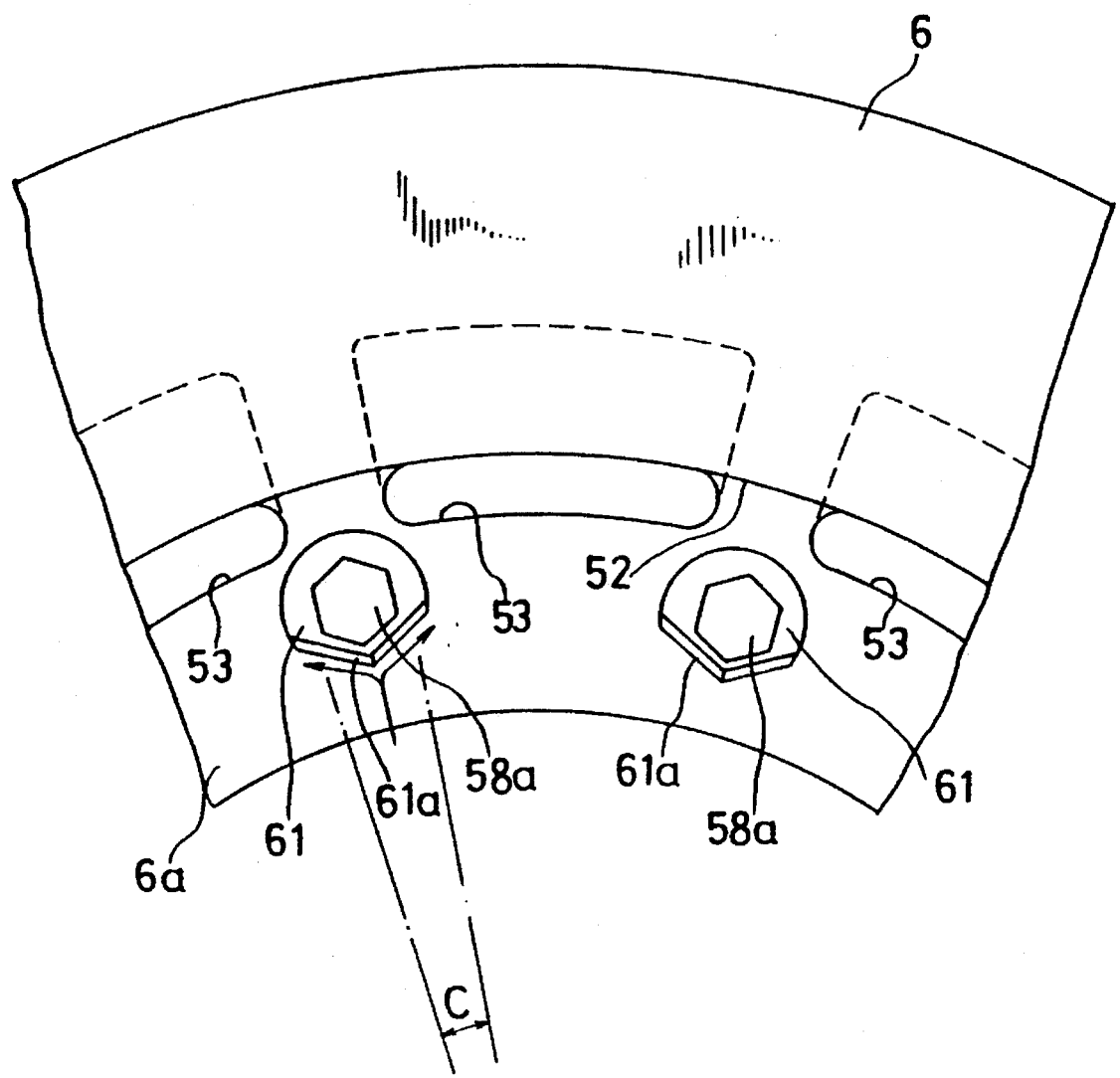
FIG. 12 is a view, corresponding to FIG. 4, of a fourth embodiment.

The form of the plain washer of the third embodiment alternatively may be as shown in FIG. 12, wherein the plane washer has two folded surfaces 61a standing and facing the center.

The folded surfaces 61a face radially inward when the washer 61 is fixed to the end face or the hub 6a.

In this instance, fluid traveling radially outward along the portion C branches out in two directions at the folded surfaces 61a of the washer 61. The fluid is then guided into the through-holes 53. Consequently, fluid traveling along the clutch disc 11-side of the second flywheel 6 will then be effectively drained through the through-holes 53.

Fifth Embodiment

Figure 13:
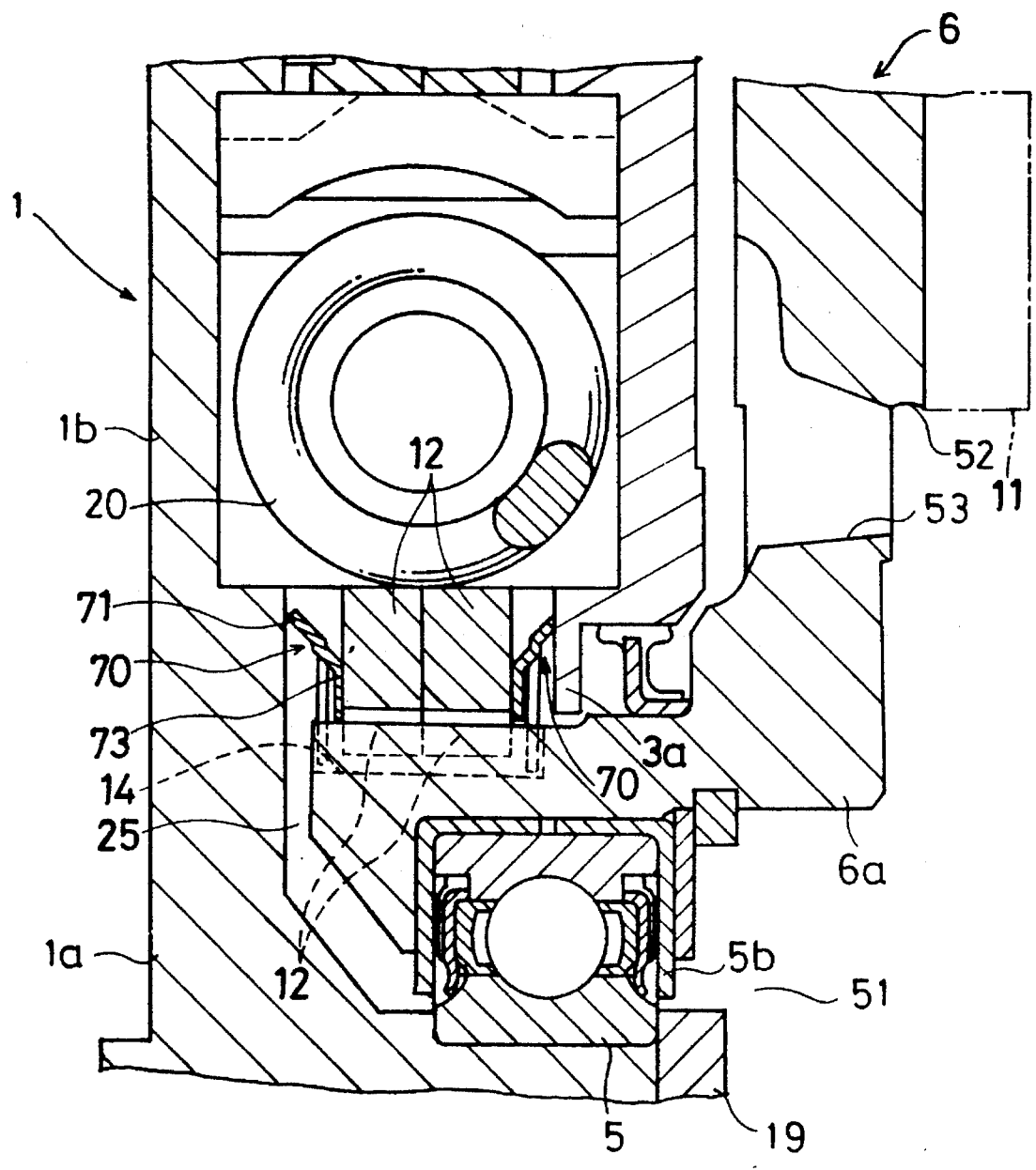
FIG. 13 is a view of a fifth embodiment, corresponding to FIG. 3.
Figure 14A:
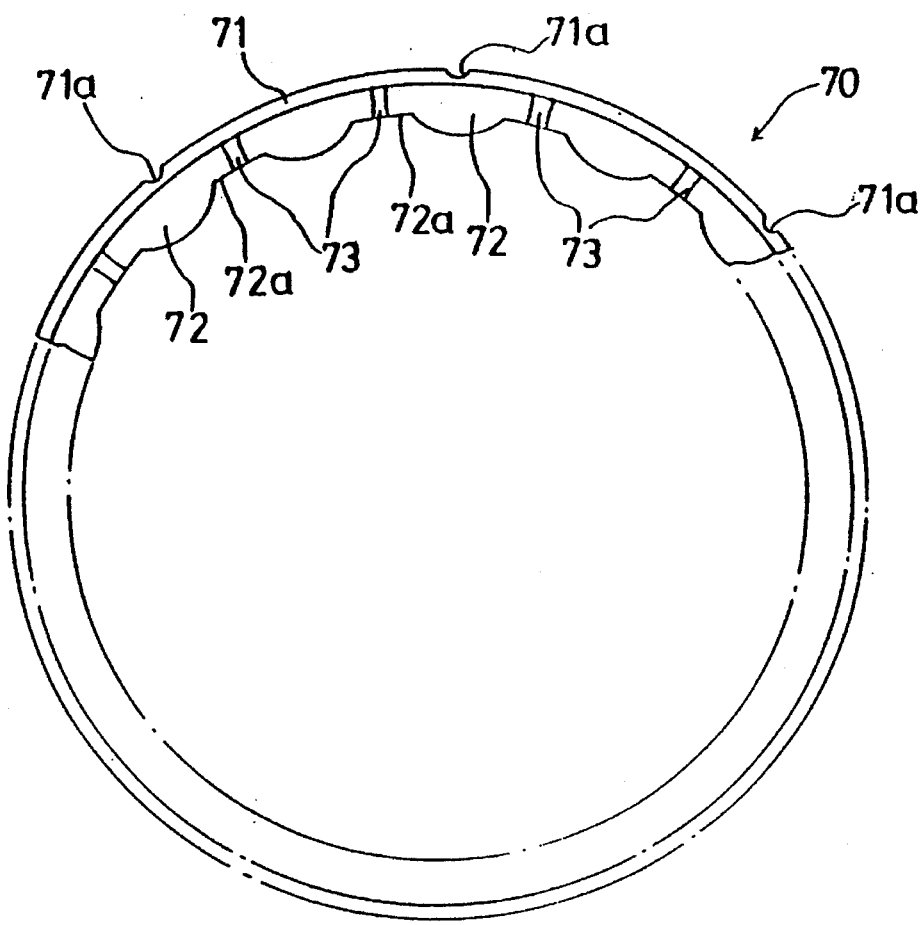
FIGS. 14a and 14b are a partial plan view and a perspective sectional view, respectively, of a cone spring of the fifth embodiment.
Figure 14B:
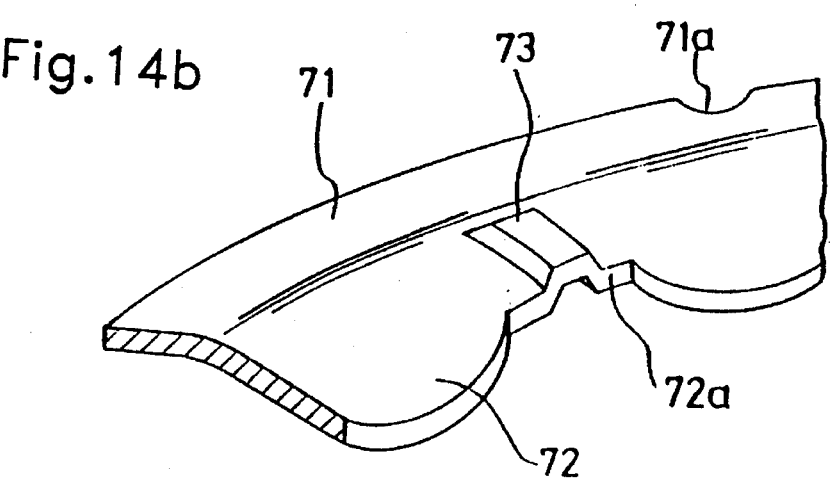

A fifth embodiment will be explained with reference to FIGS. 13 and FIGS. 14a and 14b.

Cone springs 70 are located on either side of the driven plates 12, surrounding the hub 6a of the second flywheel 6. Each cone spring consists, as shown in FIG. 14, of an annular outer rim 71 and an integral inner portion 72 having a scalloped inner edge. One of the cone springs 70 is in contact with an adjacent face of the hub 1a of the first flywheel 1 at an edge of its outer rim 71, and the other cone spring 70 is in contact with an annular projection extending from the inner end of the stop plate 2 radially inward, against an edge of its outer rim 71. The scalloped inner portion 72 is engaged with the wave teeth 14. A protrusion 73 is pressed out in the axial direction from each of recesses 72a of the inner portion 72. Each protrusion 73 slightly presses against the sides of the driven plates 12. Thus, between the cone springs 70 and the driven plates 12, gaps at a fixed spacing are defined between the protrusions 73. Through these gaps, fluid (for example, grease) which leaks out of the fluid chamber of the viscous damper mechanism 60 during its operation is guided to the engagement portion of the driven plates 12 and the hub 6a. The cone spring outer rim 71 has a plurality of cutouts 71a at fixed circumferential spacings. Through these cutouts 71a, grease which has leaked from the engagement portion of the driven plates 12 and the hub 6a toward the gap 25 and the bearing 5 is permitted to return to the viscous damper mechanism 60 under centrifugal force. Consequently, the grease tends not to remain at the bearing 5 and the seal members, thereby preventing grease leakage from the sealing region.

In this embodiment, with temperature rises within the components during the operation, the viscosity of the grease in the fluid chamber and in the engagement portion of the driven plates 12 and the hub 6a decreases. When the engine rotates at higher speeds, grease travels radially outward. When the engine rotates at lower speeds, is in its start or stop stages, the grease travels toward the gap 25 and the bearing 5. In those cases, the cone spring 70 restrains the grease from entering the gap 25 and the sealing region due to the engagement of the inner portion 72 with the engagement portion. In addition, an amount of the grease is supplied to the engagement portion whereby it is lubricated well, even during high-speed rotation, thereby preventing fretting corrosion of the engagement portion.

Generally during operation, the fluid in the fluid chamber is driven radially outward or the damper mechanism 60 under centrifugal force. But it may happen that the operating of the viscous damper mechanism 60 splashes the fluid radially inward, moving the fluid radially inward of the coil springs 20 and through the sealing portion of the interior rims 30a. Such fluid is prevented from going into the gap 25 by the cone springs 70 and is guided to the engagement portion. If some of the fluid at the engagement portions leaks into the gap 25, the fluid will be driven radially outward under centrifugal force, and then will return to the viscous damper mechanism 60 through the cutouts 71a of the cone spring outer rim 71, thereby reducing grease leakage.

Sixth Embodiment

Figure 15:
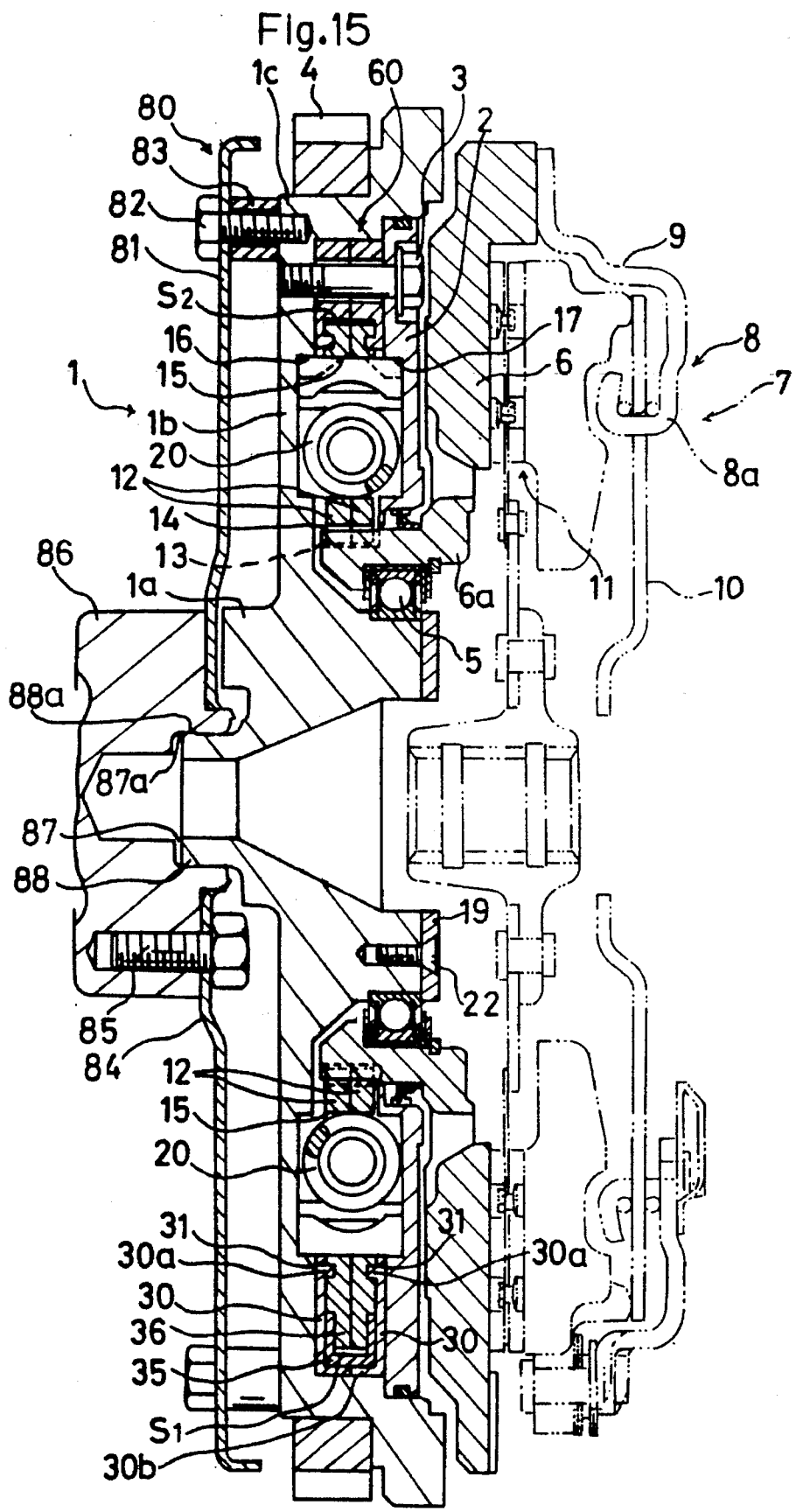
FIG. 15 is a view of a sixth embodiment, corresponding to FIG. 1.
Figure 16:
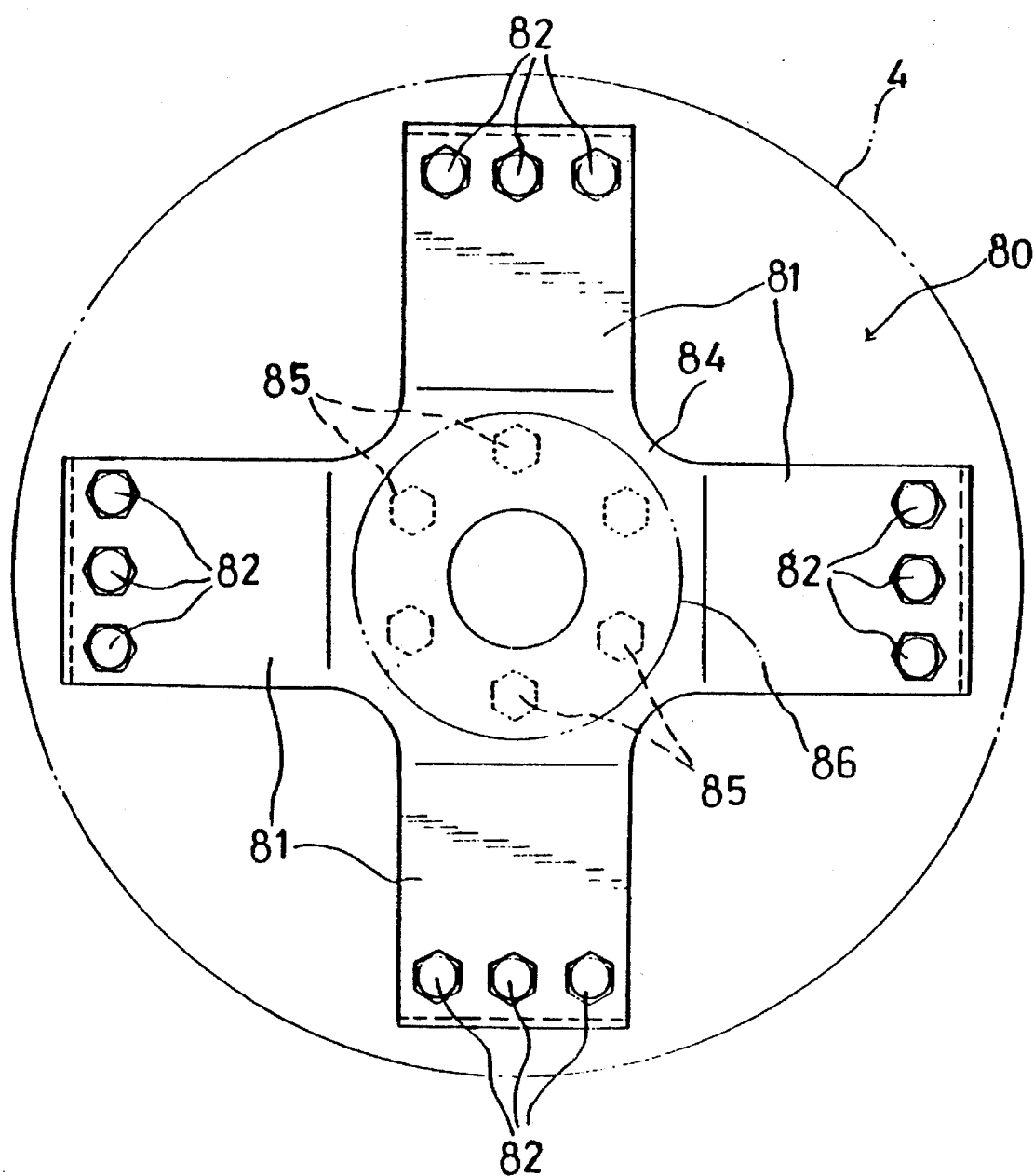
FIG. 16 is an end view of the flywheel assembly shown in FIG. 15.
Figure 17:
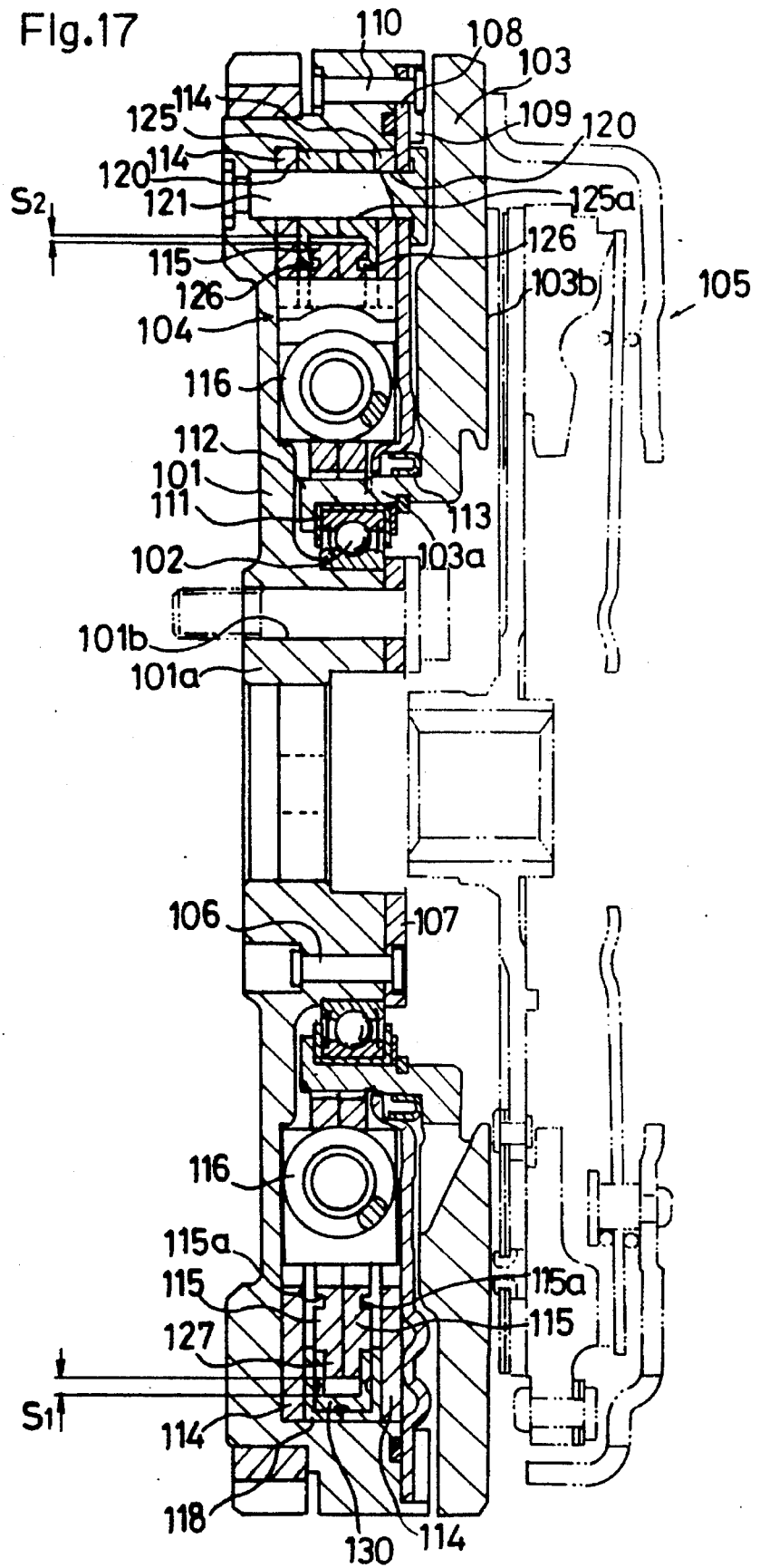
FIG. 17 is a view of a seventh embodiment, corresponding to FIG. 1.

In this embodiment, shown in FIGS. 15 and 16, a central portion of hub 1a extends toward a crankshaft 86. The crankshaft 86 has a central recess 87. Inner surface 87a of the recess 87 is rounded. The extension 88 of the hub 1a has an outer surface 88a which is rounded to mate with the inner surface 87a of the recess 87. Consequently, the extension 88 of the hub 1a is pivotally engaged with the end portion of the crankshaft 86, and the central axis of the first flywheel 1 is tiltable with respect to the central axis of the crankshaft 86. The inner surface 87a and outer surface 88a may be formed axially rectilinear with a fixed gap between them.

A flexible plate 80 is fixed to the crankshaft 86 end face. The flexible plate 80 has four arms 81. The four arms 81 are, as shown in FIG. 16, at right angles in radially extension. The tip of each arm 81 is bent toward the first flywheel 1. The arms 81 are fastened to the end face of the flywheel portion 1c by bolts 82. Collars 83 are inserted between the arms 81 and the flywheel portion 1c, around each bolt 82. A boss 84 in the center of the flexible plate 80 is fixed to the crankshaft 86 end surface by bolts 85.

Other basic structures are the same as those of the first embodiment.

Torsional vibration generated in the engine is effectively damped by the viscous damper mechanism 60 as in the aforementioned embodiments.

During operation, in addition torsional vibrations, bending vibrations act on the crankshaft 86. Bending vibrations in the crankshaft 86 are transmitted to the flexible plate 80, wherein they are absorbed by elastic deformation of the four arms 81 branching from the boss 84.

The first flywheel 1 thus does not oscillate in the axial direction during operation, whereby the bending vibrations in the crankshaft 86 are not transmitted to the transmission, thereby reducing noise during operation.

Seventh Embodiment

FIGS. 17 to 23 illustrate a flywheel assembly wherein the structures or the first flywheel.and the slider are different from those of the aforementioned embodiments.

This flywheel assembly comprises a first flywheel 101, a second flywheel 103 which is rotatably supported by the first flywheel 101 through a bearing 102, and a viscous damper mechanism 104 disposed between the first flywheel 101 and the second flywheel 103. The first flywheel 101 is connectable to the end of an engine crankshaft, and a clutch 105 is mountable on the second flywheel 103.

The first flywheel 101 is substantially a disc and has a recess for containing the viscous damper mechanism 104. The first flywheel 101 has a central hub 101a, around which periphery the bearing 102 is installed. The bearing 102 is retained by a plate 107 fixed to the hub 101a end face by rivets 106. The hub 101a has holes 101b through which bolts penetrate for fastening the flywheel assembly to the crankshaft, A stop plate 108 and a subplate 109 are for installing the viscous damper mechanism 104 into the first flywheel 101 on its second flywheel 103-side surface, wherein these plates 108 and 109 are fastened to the periphery of the first flywheel 1 by rivets 110.

Figure 18:
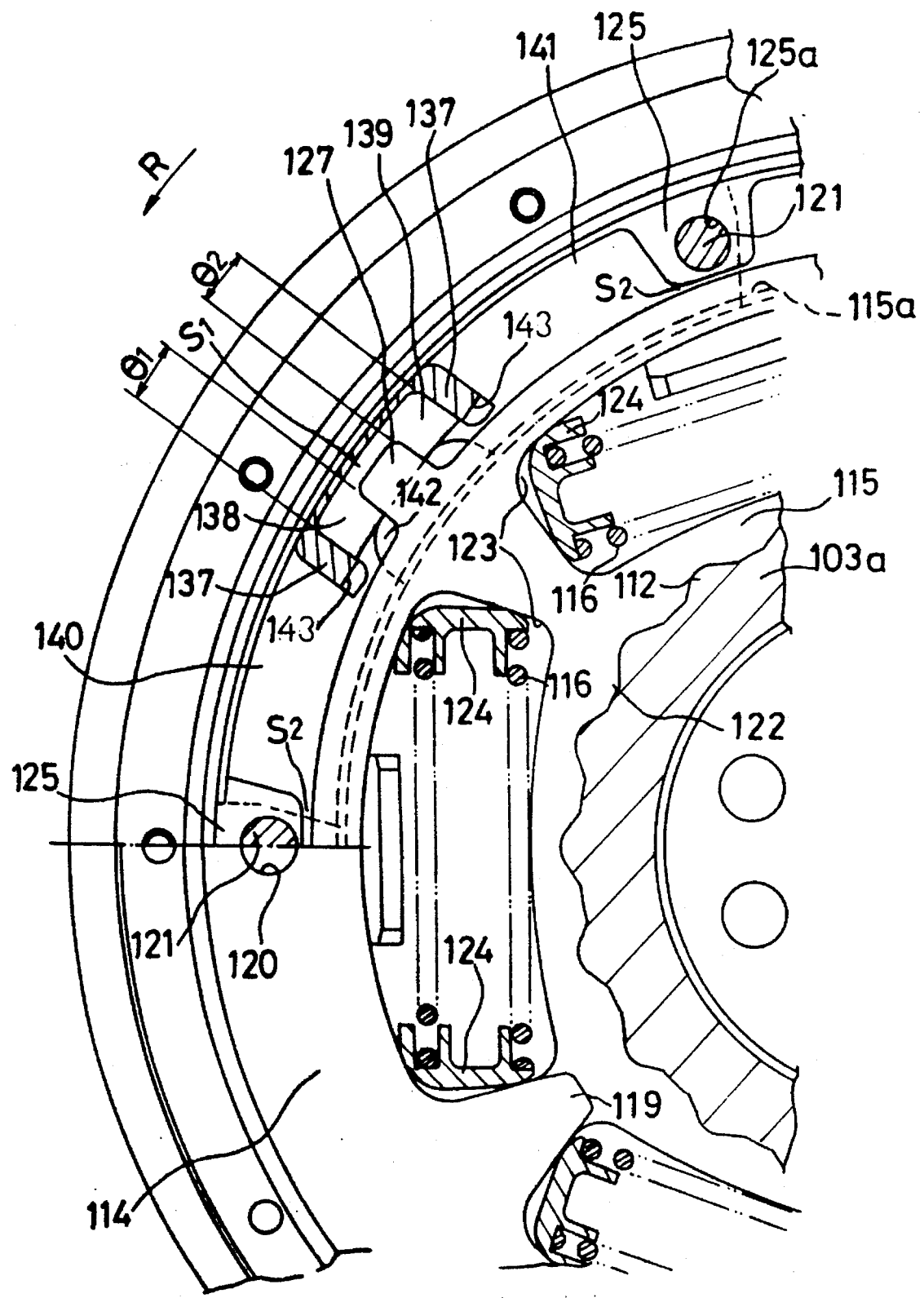
FIG. 18 is a partially cut away, sectional view of the seventh embodiment, with correspondence to FIG. 2.

The second flywheel 103 is substantially a disc and has a central hub 103a. The hub 103a extends toward the first flywheel 1 and the bearing 102 is installed in its inner surface. The bearing 102 seals lubricant therein. An insulation member 111 is provided between the bearing 102 and the hub 103a to insulate from the heat of the clutch 105. The insulation member 111 is in contact with the outer race or the bearing 102, not with its inner race. Wave-like teeth 112 for engagement with an output portion of the viscous damper mechanism 104, as shown in FIG. 18, are formed around the periphery adjacent the crown of the hub 103a. Around the base of the hub 103a crown, a seal member 113 is provided for sealing off fluid from the viscous damper mechanism 104 between the hub 103a and the stopper plate 108 inner portion. The second flywheel 103 has a friction facing 103b onto which friction material of the clutch disc is pressed.

Next, the viscous damper mechanism 104 will be explained.

The viscous damper mechanism 104 principally comprises a pair of opposed drive plates 114, a pair of driven plate 115 between the pair of drive plates 114, torsional springs 116 elastically connecting both plates 114 and 115, and a fluid housing 118.

The drive plates 114 are rings having projections 119, as shown in FIG. 18, extending radially inward at fixed intervals. A gap is thus defined between adjacent projections 119 for receiving the torsional springs 116.

The drive plates 114 have a series of holes 120, into which fixing pins 121 penetrate, whereby the pair of the drive plates 114, the stop plate 108, and tabs (later described) of the fluid housing 118 disposed between the pair of drive plates 114 are fixed together.

The driven plates 115 are rings having inner wave-like teeth 122 as shown in FIG. 18. The inner teeth 122 engage with the outer teeth 112 formed on the second flywheel 103 such that the driven plates 115 and the second flywheel 103 rotate together. The driven plates 115 have a series of apertures 123 circumferentially spaced apart from one another. These apertures 123 correspond to the gaps between adjacent projections 119 of the drive plates 114, wherein the spaces defined by them contain the torsional springs 116. The torsional springs 116 are thus arranged in the apertures 123, wherein they abut against the circumferentially opposing walls of the apertures 123 through spring seats 124. When the viscous damper mechanism is in its free state, only the radially inward ends of the torsional springs 116 abut against the circumferentially opposing walls of the apertures 128, as shown in FIG. 18. That is, the torsional springs 116 contained in the apertures 123 have their ends situated on a bias with respect to the opposing walls of the apertures 123.

The driven plates 115 have a series of projections 127 extending radially outward from the portions between adjacent apertures 123.

An annular fluid housing 118 is sandwiched between the pair of drive plates 114 around the periphery of the driven plates 115. The fluid housing 118 has a plurality of tabs 125 circumferentially spaced apart from one another, as shown in FIG. 18. The tabs 125 have holes 125a into which fixing pins 121 are inserted.

Figure 19:
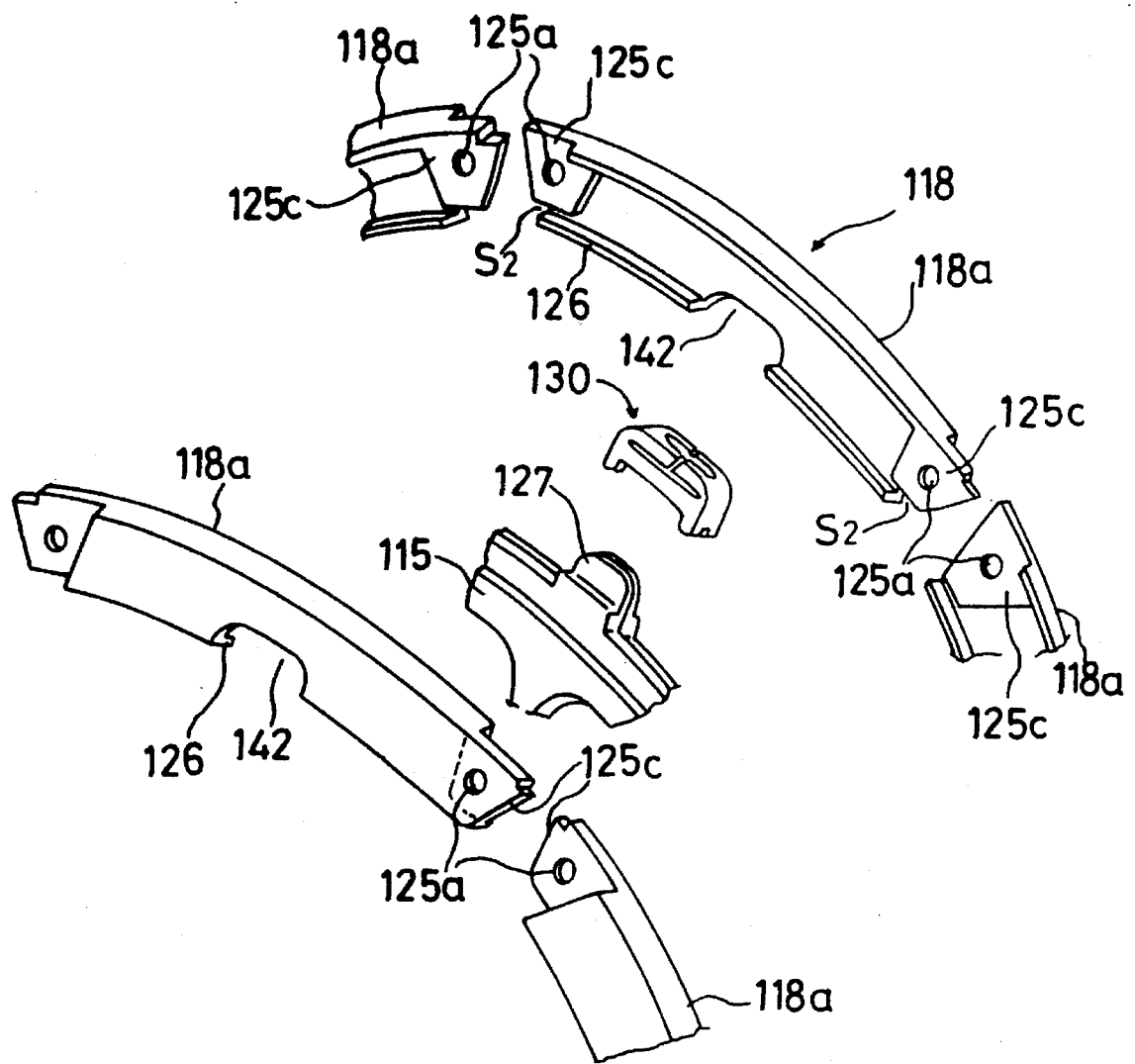
FIG. 19 is a view of the seventh embodiment, corresponding to FIG. 6.

The fluid housing 118 is divisible into two parts in the axial direction and five parts in the circumferential direction, as partially represented in FIG. 19. That is, the fluid housing 118 consist of a total of ten substantially sectoral housing members 118a. The complementary tab portions 125c of adjacent housing members 118a overlap each other, and are connected to each other by the fixing pins 121, such that the fluid housing 118 forms an annular configuration and is connected to the drive plates 114.

The radially interior portion of the fluid chamber in the fluid housing 118 is sealed by fitting interior rims 126 (FIG. 19) formed along the radially inward edge of the fluid housing 118 into annular grooves 110a formed in the driven plates 115.

Figure 20:
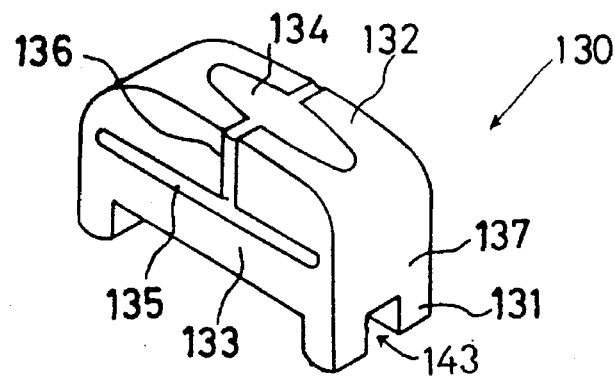
FIG. 20 is a perspective view of a slider of the seventh embodiment.
Figure 21:
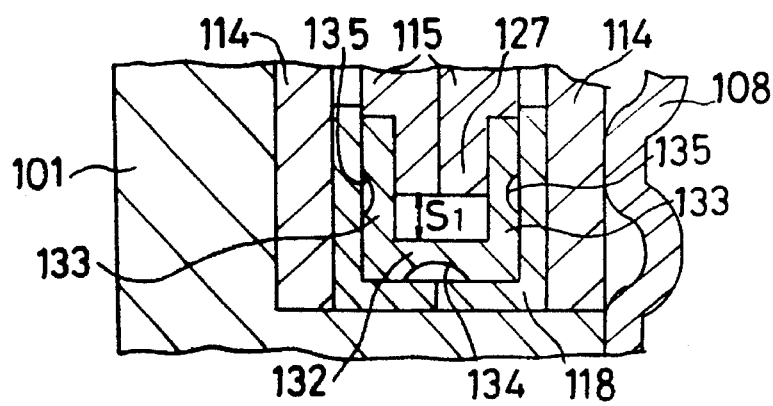
FIG. 21 is an enlarged, partly in sectional view of the seventh embodiment.

FIG. 20 shows a slider 130, which is slidably disposed within the fluid housing 118. The slider 130 is formed as a cap which opens radially inwardly and contains the projection 127 of the driven plates 115. The slider 130 is made of resin, and its outer peripheral surface 132 in the radial direction is arced to conform to the inner surface of the peripheral wall 118a of the fluid housing 118. A pair of leg portions 131 is formed on the circumferential ends of the slider 130, therein providing a fluid passages 143 between adjacent pairs of the leg portions 131. The leg portions 131 of the slider 130 are in slidable contact with the peripheral composite edge of the driven plates 115. As shown in FIG. 21, the outer wall 132 of the slider 130 and the side walls 133 extending circumferentially are slidably in contact with the inner wall of the fluid housing 118. A fossa 134 is formed in the surface of outer wall 132 of the slider 130. A groove 135 extending in the circumferential direction is formed on the side walls 133. The fossa 134 and the grooves 135 are connected by connecting grooves 136.

The circumferentially opposed walls of each slider 130 form stops 137 which are circumferentially spaced apart from the projection 127 by, for example, angles of θ1 and θ2, respectively, when the engine is at rest (see FIG. 18). The projection 127 divides the space interior of the slider 130 into a first subcompartment 138 in Its forward portion, and a second subcompartment 139 in its rear portion, with respect to the direction of rotation R, and forms a subchoke S1 whereby the subcompartments 138 and 139 communicate along the inner surface of the slider 130.

Main chokes S2 whereby adjacent compartments 140 and 141 communicate are formed between the inner surface of the tabs 125 and the peripheral composite edge of the driven plates 115. The clearance of main chokes S2 is smaller than that of the subchokes S1. In other words, the cross-sectional area of each subchoke S1 is greater than that of each main choke S2.

Fluid compensation cutouts 142 are formed in axially opposed surfaces of the fluid housing 118. The fluid compensation cutouts 142 are formed midway of adjacent main chokes S2 in the circumferential direction and are located along the radially inward portion of the fluid housing 118, opening toward the axis.

Description will now be made of the operation of the aforementioned embodiment.

When torsional torque is generated, the drive plates 114 twist clockwise or counterclockwise relative to the direction of rotation of the driven plates 115. Initially, under small-angle torsion, the torsional springs 116 are compressed such that their biased ends Just meet the adjacent walls of the apertures 123, wherein the viscous damper mechanism provides low-torsion rigidity. As the angle of torsion increases, the torsional springs 116 are compressed such that their ends abut the corresponding end faces of the apertures 123, wherein the viscous damper mechanism provides high-torsion rigidity.

The generation of hysteresis torque due to the fluid flow caused by changes in torsional torque is the same as that described for the first embodiment.

When the sliders 130 move during operation of the viscous damper mechanism, the outer wall 132 and the side walls 133 of the slider 130 slide along the interior wall of the fluid housing 118. At this time, the fluid in the fossa 134 is supplied to the grooves 135, whereby the contact region of the side walls 133 and the interior wall of the fluid housing 118 is lubricated well. As a result, fusing of the slider 130 to the interior wall, and wear in general, is prevented, improving durability of the viscous damper mechanism 104. Further, fluid is always supplied to the fossa 134, since fluid in the fluid housing 118 is driven radially outward by centrifugal force.

Figure 22:
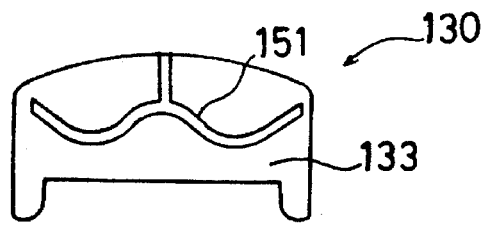
FIG. 22 is a view showing a further example of a slider of the seventh embodiment.
Figure 23:
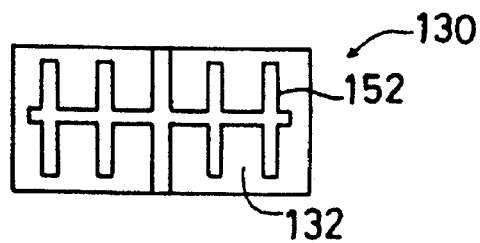
FIG. 23 is a view showing another example of a slider of the seventh embodiment.

Alternative forms of the grooves 135 and the fossa 134 are possible. For example, as shown in FIG. 22, a wave-form groove 151 may be provided. A network 152, wherein several grooves intersect a central groove, may be provided as shown in FIG. 23.

Various details of the invention may be changed without departing from its spirit nor its scope. Furthermore, the foregoing description of the embodiments according to the present invention is provided for the purpose of Illustration only, and not for the purpose of limiting the invention as defined by the appended claims and their equivalents.

What is claimed is:

1. A flywheel assembly, comprising:
   a first flywheel having a central hub which is rotatably engaged with a recessed end of an engine crankshaft;
   a second flywheel rotatably supported by said first flywheel;
   a viscous damping mechanism located between said first and second flywheels for damping torsional vibrations therebetween; and
   a plate for absorbing bending oscillations from said engine, a central portion of which is fixed to said crankshaft, said plate having a plurality of radially extending arms circumferentially equidistant, and ends of said arms being fixed to said first flywheel periphery.

2. A flywheel assembly according to claim 1, further comprising an input plate connected to said first flywheel and an output plate connected to said second flywheel, wherein said viscous damping mechanism is located between said both plates.

3. A flywheel assembly according to claim 2, wherein said viscous damping mechanism includes a fluid housing peripherally disposed on said input plate and opening radially inward, a choke projection provided on the periphery of said output plate and projecting into said fluid housing, a slider slidably located in said fluid housing and covering said choke projection, and a choke tab formed in said fluid housing.

4. A flywheel assembly according to claim 3, wherein said choke tab defines a flow passage smaller than that of said choke projection.

5. A flywheel assembly according to claim 4, further comprising a fluid compensation mechanism having a fluid storage disposed radially inward of said fluid housing, and a communication between said fluid storage and said fluid housing.

6. A flywheel assembly according to claim 1, further comprising a clutch mounted on said second flywheel.

7. A flywheel assembly comprising:
   a first flywheel having a central hub configured to engage a recessed end of an engine crankshaft, said central hub being rotatable relative to said recessed end;
   a second flywheel supported on said first flywheel for limited relative rotary displacement relative to said first flywheel;
   a viscous damping mechanism located between said first and second flywheels for damping torsional vibrations therebetween; and
   a plate having a central portion and a plurality of equidistantly spaced apart radially extending arms, said central portion being attached to said engine crankshaft and an outer radial end of each of said arms being attached to a radial periphery of said first flywheel.

* * * * *